US 12,361,244 B1
Jul. 15, 2025

(12) United States Patent
Garrett et al.

(10) Patent No.: US 12,361,244 B1
(45) Date of Patent: Jul. 15, 2025

(54) VALIDATION OF OBJECTS

(71) Applicant: Google LLC, Mountain View, CA (US)

(72) Inventors: Samuel Gardner Garrett, Seattle, WA (US); Peter Sarossy, Mableton, GA (US); Rachel Soukup, Seattle, WA (US); Avinash Panga, Woodinville, WA (US); Yong Hoon Kim, Belmont, CA (US); Addison Hammer, Charleston, SC (US); Jingwen Mao, Seattle, WA (US)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 18/647,810

(22) Filed: Apr. 26, 2024

(51) Int. Cl.
G06K 7/14 (2006.01)
(52) U.S. Cl.
CPC .................. G06K 7/1413 (2013.01)
(58) Field of Classification Search
CPC ...... G06K 7/1413; G06K 7/1417; G06K 7/14; G06K 7/10861
USPC ............ 235/462.42, 462.41, 462.24, 462.11, 235/462.01
See application file for complete search history.

(56) References Cited

U.S. PATENT DOCUMENTS

| 8,251,303 | B2 | 8/2012 | Wozny |
| 9,444,924 | B2 | 9/2016 | Rodriguez et al. |
| 2016/0303575 | A1 | 10/2016 | Smith |
| 2019/0114804 | A1* | 4/2019 | Sundaresan ............... G06T 7/74 |
| 2019/0304102 | A1* | 10/2019 | Chen ...................... G06N 20/00 |
| 2021/0217129 | A1 | 7/2021 | Deshmukh et al. |
| 2021/0365707 | A1* | 11/2021 | Mao ...................... H04N 23/632 |
| 2023/0230250 | A1* | 7/2023 | Vianello ................. G06T 7/70 382/159 |

OTHER PUBLICATIONS

Ironclad Intergrated Auditing System, Certificate of Destruction, GarnerProducts.com, Mar. 1, 2022, pages.
Kirvan, P., "Data sanitization techniques: Standards, practices, legislation", Dec. 30, 2020, [online] [retrieved Mar. 13, 2024]. Retrieved from the Internet: <URL:https//www.techtarget.com/searchdatabackup/tip/Effective-data-sanitization-How-regulations-and-standards-address-it>, 7 pages.

(Continued)

Primary Examiner — Edwyn Labaze
(74) Attorney, Agent, or Firm — Lerner David LLP

(57) ABSTRACT

Methods, systems, and media for validating objects within a container, such that a validation system confirms that objects within a container are valid i.e., ready to be shipped from a data center for reuse or ready to be destroyed. The validation system can be used to identify objects, e.g., media, disks, etc., and determine if valid objects are at the correct processing location to be shipped or destroyed. The methods may include identifying the objects, locating an identifier on the object, comparing the identifiers to known identifiers and determining, based on the comparison, if valid objects are at the correct processing location to be shipped or destroyed. The validation system may also use image processing techniques, such as blob detection, to identify invalid objects in the container. The system may reject the entire container if invalid objects are detected.

20 Claims, 24 Drawing Sheets

(56) References Cited

OTHER PUBLICATIONS

Platsis, G., "Security Intelligence, Data Destruction: Importance and Best Practices" [online] [retrieved Mar. 13, 2024]. Retrieved from the Internet: <URL:http://securityintelligence.com/articles/data-destruction-importance-and-best-practices/>, Nov. 19, 2020, 10 pages.

What Is A Certificate Of Data Destruction, DTC Computer Supplies, Jul. 12, 2021, [online] Retrieved from the Internet: <<URL:http://www.linkedin.com/pulse/what-certificate-data-destruction-dtcomputersupplies.html>, 9 pages.

* cited by examiner

VALIDATION OF OBJECTS

BACKGROUND

Data destruction and disk processing procedures typically use specially designed lockers, dedicated warehouse space, and a variety of destruction equipment and dedicated partitions for processing media for reuse or destruction. The processing of the media requires multiple steps, performed mostly by human operators, and each step with their own associated latency. The media is tracked through this process by scanning their barcodes. The processing of these items typically includes swapping an old item for a new item, a locker scan, a cage scan, shipping and destroying scans, and label creation.

The process of data destruction and disk processing is error prone due to many discrete steps and requires a large and dedicated space to complete. Scanning barcodes does not account for what the operator is doing, especially as the media is manually moved. Moreover, the bar codes do not provide confirmation until the next scan at the next processing step. Not only does each step take a considerable amount of time, but the process is also susceptible to operator error at each step, such as missed steps, missed scans, marking an item intended to be reused as to be destroyed or vice versa, processing only some of the items, etc. Also, disks containing content to be destroyed, referred to as "dirty media," may dwell in processing, increasing the likelihood of escape, the task not being completed, or the like.

BRIEF SUMMARY

The present disclosure provides for systems and techniques for validating objects within a container. Objects, such as media from a data center, may be validated by a validation system that confirms the objects within a container are valid. A valid object corresponds to an object that is either ready to be shipped from a data center for reuse or ready to be destroyed. The validation process includes identifying the objects within the container by comparing an image of the container to a reference image of the container. When an object is identified, the validation system determines whether an identifier is present. The identifier may be, for example, a bar code, a QR code, or the like. The identifier is compared to known identifiers. If the identifier matches a known identifier, the object is determined to be a valid object, such that the object is ready to be shipped or destroyed. The validation system may also use image processing techniques, such as blob detection, to identify invalid objects in the container. The system may reject the entire container if invalid objects are detected. In some examples, the validation system may further include a destruction validation system that may validate, using image processing techniques, whether objects to be destroyed have been completely destroyed by a destruction machine.

One aspect of the technology is directed to a system comprising a cabin configured to receive a container comprising compartments configured to receive an object. The system may also comprise an imaging system housed within the cabin. The imaging system housed within the cabin, the imaging system comprising at least one imaging device, at least one light configured to illuminate the container during image capture, one or more processors, the one or more processors configured to receive at least one image captured by the at least one imaging device, identify, using image processing by comparing the at least one image to a reference image, one or more empty compartments, determine, using image processing, whether an identifier associated with the object is present within the remaining compartments, when the identifier is present, compare the identifier to known identifiers to confirm the presence of a valid object in the remaining compartments, when the identifier is not present, determine whether the remaining compartments are empty, the determining comprising processing, using blob detection, the at least one image to identify regions of interest in the at least one image, comparing optical characteristics of the regions of interest with ground truth characteristics, wherein the ground truth characteristics are based on the reference image and when the difference between the optical characteristics and the ground truth characteristics is greater than a threshold, identify the region of interest as an invalid object.

According to aspects of the disclosure, the one or more processors are further configured to adjust the orientation of the at least one image to correspond to an orientation of a reference image of the container. When the difference between the optical characteristics of the regions of interest and the ground truth characteristics is less than the threshold, the system may identify the region of interest. In some examples, when the region of interest is identified as the invalid object, the one or more processors may be further configured to provide for out a notification associated with the identification of an invalid object. In some examples, the notification is further associated with at least one of the remaining compartments. In some examples, the identifier may be a barcode, QR code, or Detex code. In some examples, when the region of interest is identified as the invalid object, the one or more processors may be further configured to reject the container.

According to aspects of the disclosure, the system may be further comprise a central management system. The central management system may include a memory storin the known identifiers and one or more processors in communication with the memory, wherein the one or more processors are configured to receive, from the imaging system, a notification indicating a validation of the container, and determine, based on the validation of the container and the identifiers associated with the objects within the container, a next action. In some examples, the next action may include at least one of a destruction action or a shipping action. In some examples, when the next action is the destruction action, the system may further comprise a destruction validation system. The destruction validation system may comprise a destruction device, comprising an opening. The destruction validation system may further include a locking cabin situated at the opening of the destruction device, wherein the locking cabin is configured to receive the object whose determined next action is the destruction action, a second imaging system comprising at least one imaging device, one or more second processors. The one or more second processors may be configured to receive at least one image captured by the at least one imaging device, identify, using image processing techniques, the object whose next action is the destruction action has been placed in the locking cabin, instruct the locking cabin to drop the object whose next action was the destruction action into the destruction device, instruct the destruction device to activate, instruct, after an amount of time, the second imaging system to capture a second image of the locking cabin, receive the second image, verify the object whose next action was the destruction action has been destroyed and transmit a notification confirming the object has been destroyed to the central management system.

Another aspect of the technology relates to a method of receiving, by one or more processors of a validation system, at least one image of a container comprising a plurality of compartments configured to receive a plurality of objects, identifying, by the one or more processors based on a comparison of the at least one received image and at least one image to a reference image, one or more empty compartments of the plurality of compartments, determining, by the one or more processors, whether an identifier is present within the remaining compartments of the plurality of compartments, when the identifier is present, comparing, by the one or more processors, the identifier to known identifiers to confirm the presence of a valid object in the remaining compartments, when the identifier is not present, determining, by the one or more processors, whether the remaining compartments are empty. The determining may further comprise processing, using blob detection, the image to identify regions of interest in the image, comparing optical characteristics of the regions of interest with ground truth characteristics, wherein the ground truth characteristics are based on the reference image, and when the difference between the optical characteristics and the ground truth characteristics is greater than a threshold, identifying the region of interest as an invalid object. The method my further comprise rejecting, by the one or more processors based on the identification of the invalid object, the container from the validation system.

In some examples, the method may further comprise capturing, by an imaging component, the at least one image, wherein the imaging component comprises at least one imaging device and at least one light configured to illuminate the plurality of compartments. The method may further comprise adjusting the orientation of the at least one image to correspond to an orientation of a reference image of the container. When the difference between the optical characteristics of regions of interest and the ground truth characteristics are less than the threshold, the method may further comprise identifying the region of interest empty. Wherein when the region of interest is identified as the invalid object, providing, by the one or more processors, for output a notification associated with the identification of an invalid object. The notification may be further associated with at least one of the remaining compartments. The identifier may be a barcode, QR code, or Detex code.

According to aspects of the disclosure, the method may further comprise coupling to a central management system. The central management system may include a memory storin the known identifiers and one or more processors in communication with the memory, wherein the one or more processors are configured to receive, from the imaging system, a notification indicating a validation of the container, and determine, based on the validation of the container and the identifiers associated with the objects within the container, a next action. In some examples, the next action may include at least one of a destruction action or a shipping action. In some examples, when the next action is the destruction action, the system may further comprise a destruction validation system.

The method may comprise further coupling to a destruction validation system. The destruction validation system may comprise a destruction device, comprising an opening. The destruction validation system may further include a locking cabin situated at the opening of the destruction device, wherein the locking cabin is configured to receive the object whose determined next action is the destruction action, a second imaging system comprising at least one imaging device, one or more second processors. The one or more second processors may be configured to receive at least one image captured by the at least one imaging device, identify, using image processing techniques, the object whose next action is the destruction action has been placed in the locking cabin, instruct the locking cabin to drop the object whose next action was the destruction action into the destruction device, instruct the destruction device to activate, instruct, after an amount of time, the second imaging system to capture a second image of the locking cabin, receive the second image, verify the object whose next action was the destruction action has been destroyed and transmit a notification confirming the object has been destroyed to the central management system.

BRIEF DESCRIPTION OF THE DRAWINGS

A more complete appreciation of the subject matter of the disclosure and various advantages thereof can be realized by reference to the following detailed description, in which reference is made to the following accompanying drawings.

DETAILED DESCRIPTION

This technology described in this disclosure generally relates to techniques for validating objects within a container, such that a validation system confirms that objects within a container are valid or invalid. Valid objects are objects that have been marked, or identified, for reuse or destruction. Invalid objects are objects that are not marked for reuse or destruction. The validation system can be used to identify objects, e.g., media, disks, etc., and determine if valid objects are at the correct processing location to be reused or destroyed. According to some examples, when objects are marked for reuse, the objects may be further marked for shipping to a location to be reused.

Figure 1:
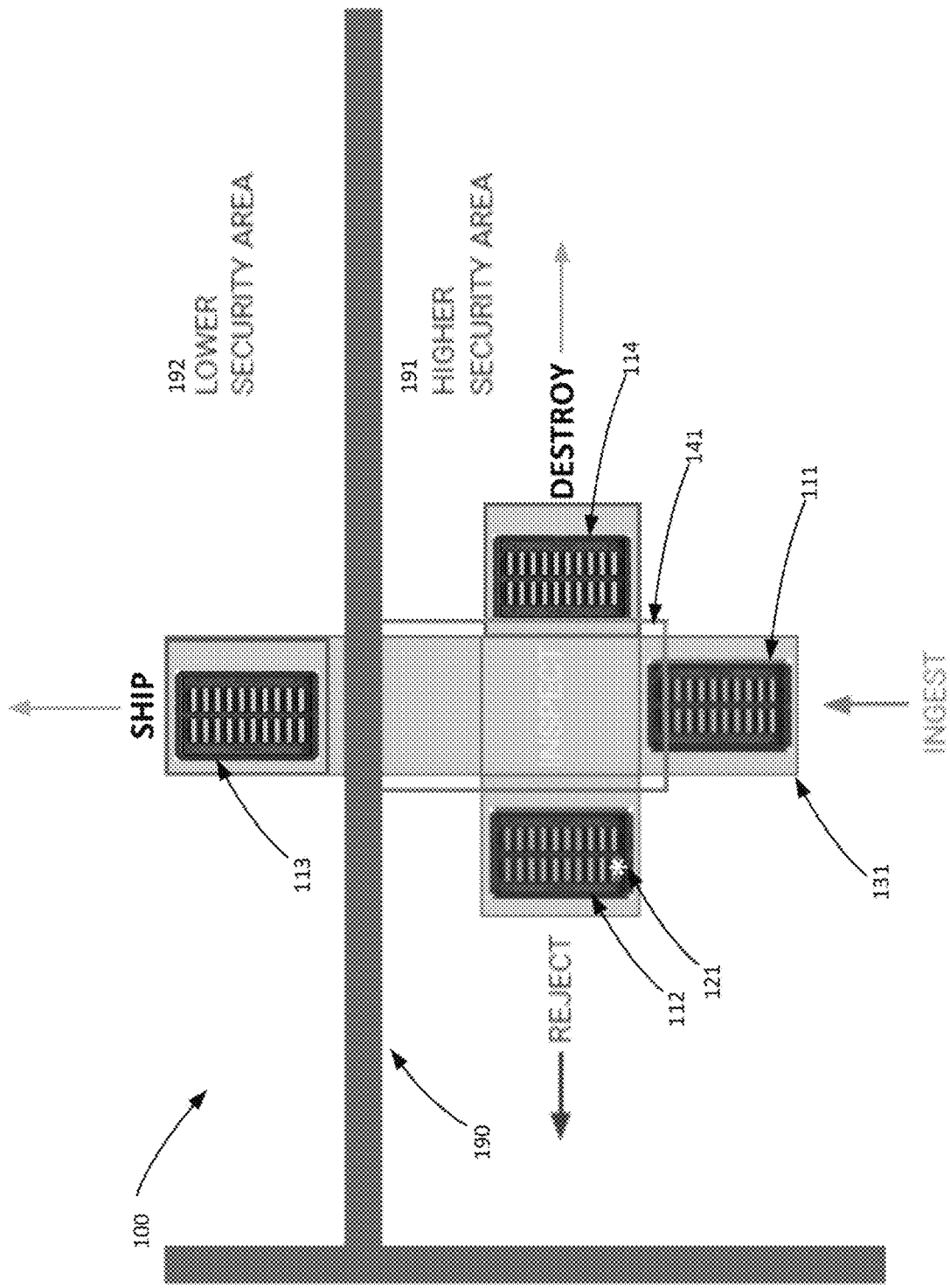
FIG. 1 is a schematic view of a validation system according to aspects of the present disclosure.

FIG. 1 illustrates an example validation system 100 according to aspects of the disclosure. The validation system 100 may include a transport means 131, imaging cabin 141, and containers, such as containers 111-114. The containers 111-114 are configured to hold objects to be processed. The containers may include a plurality of compartments, or slots. Objects may be loaded into the compartments. The objects loaded into the container may be hard drives, servers, storage devices, etc. The containers 111-114 and the objects therein are configured to be processed by the validation system 100 to identify whether the objects within the containers are valid or invalid. If the objects in the container are valid, the container may continue to be processed for reuse or destruction. In examples where at least some of the objects in the container are invalid, the container may be identified for further review and/or processing to remove the invalid objects.

The transport means 131 is configured to move containers to designated areas within the validation system 100. The designated areas may be spaces or rooms within a data center defined based on the destination of the objects within the containers. For example, there may be designated areas for sorting media, shipping the containers and media therein, or destruction of the media within the containers. The transport means 131 may be a conveyor belt, roller conveyors, or any other transport means suitable to move the containers.

The imaging cabin 141 is configured to receive containers, e.g., containers 111-114. For example, container 111 may be placed onto the transport means 131 by a data center operator, machine operator, machine, robot, or the like. The container 111 may be scanned upon placement onto the transport means 131. The scan may be recorded to mark the beginning of the processing of the container 111.

Once the container 111 is on the transport means 131, the transport means 131 may move, or advance, the container 111 into the imaging cabin 141. According to some examples, another scan of the container 111 may be captured and recorded to mark the advancement of the processing of the container 111. The scans at each processing step may be automatic, e.g., captured upon the container's advancement to a certain location of the validation system 100. In some examples, an operator may perform the scans.

In some examples, the system may use mobile automated outbound verification. For example, an operator may place a container or objects into the scanner and close a first door of the imaging cabin that would then lock. The system would scan or image the container, and if scan results showed the objects in the container were valid and destined for the same area, i.e. shipping or destruction, then a second door on the other side of the imaging cabin would open and allow an operator to remove the container. Following the same example, if the objects in the container were invalid then the second door would remain locked and the first door would open again, allowing the operator to remove the container from the imaging cabin and correct the issue.

The imaging cabin 141 contains an imaging system configured to capture images of the container 111. The imaging cabin 141 is a structural frame member that holds the cameras and lights of the imaging system above the container and objects to be detected. In some examples, the imaging cabin 141 may be an imaging locker that may lock to prevent any displacement of the container 111 and, therefore, the objects within the container 111 once the container 111 has been loaded into the imaging cabin 141. The imagine locker may be considered a container stop, which physically blocks the transition of the container to a zone while a decision on the disposition of the container is occurring. Having a locking mechanism on the imaging cabin 141 reduces instances of mishandling or misplacement of objects. Further, by engaging the locking mechanism on the imaging cabin 141, human tampering of the objects within the container 111 is prevented.

Using image processing techniques, the validation system 100 processes, e.g., analyzes images of the container 111 and determines if the objects within the container are valid objects that are ready to be shipped for reuse, valid objects that are ready to be destroyed, invalid objects, or no objects at all. As depicted in FIG. 1, the validation system 100 may determine that container 112 has an invalid object 121, container 113 is ready to be shipped for reuse, and container 114 is ready to be destroyed.

Validating the contents, or lack thereof, of a container reduces errors and processing time in data destruction and disk processing operations in a data center. For example, the containers may be packed with many objects from the data center to be reused and/or destroyed. Some of the items may contain information not intended to be publicly available, not intended to be destroyed, or the like. To ensure that only the items marked for destruction or reuse are properly handled within the data center, the imaging system can automatically provide checks, e.g., validation, on the objects within the containers. The validation of objects, e.g., as invalid or valid objects, ensures that only objects marked for reuse leave a designated area and objects marked for destruction are directed to a destruction area.

In some examples, the validation system 100 may be located within different areas of the datacenter. For example, at least part of the validation system 100 may be housed in a higher security area 191 and extend into a lower security area 192. The higher security area 191 and lower security area 192 may be separated by a structure 190, such as a partition that provides a visual and physical barrier. The system 100 may transport, via the transport means 131, a container, e.g., container 113, that has been inspected from the higher security area 191 to the lower security area 192 for further processing and shipping. This physical configuration allows for increased security of the media in data centers and reduces the chances of unintended material escape and enables data center operators to initiate the shipping process. For example, by having at least a portion of the validation system 100 in a higher security area 191, containers that have not had their contents validated or approved to pass into the lower security area remain within the higher security area 191 of the datacenter. This prevents objects, e.g., media, disks, etc., from leaving the datacenter before being validated. Only after the contents of the container have been validated can the container move to a lower security area 192 for the contents to be reused or shipped. In some examples, destruction occurs exclusively in the higher security area 191. Containers with dirty media that do not pass to lower security area 192 and will be rejected by the system and remain in the higher security area 191 where the dirty media will be destroyed.

In some examples, there may be designated areas within the higher security area 191 and the lower security area 192. For example, the higher security area 191 may have designated areas for media sorting and media destruction. Further, the lower security area 192 may have a designated area for media shipping. The levels of security at the designated areas are integral to ensuring heightened security of sensitive information within the media. In some examples, the higher security area 191 and the lower security area 192 may be divided by the structure 190 and the only means to move a container across the structure is through an imaging cabin 141. This limits transport of the containers and provides for continuous tracking of the contents of the container.

Figure 2:
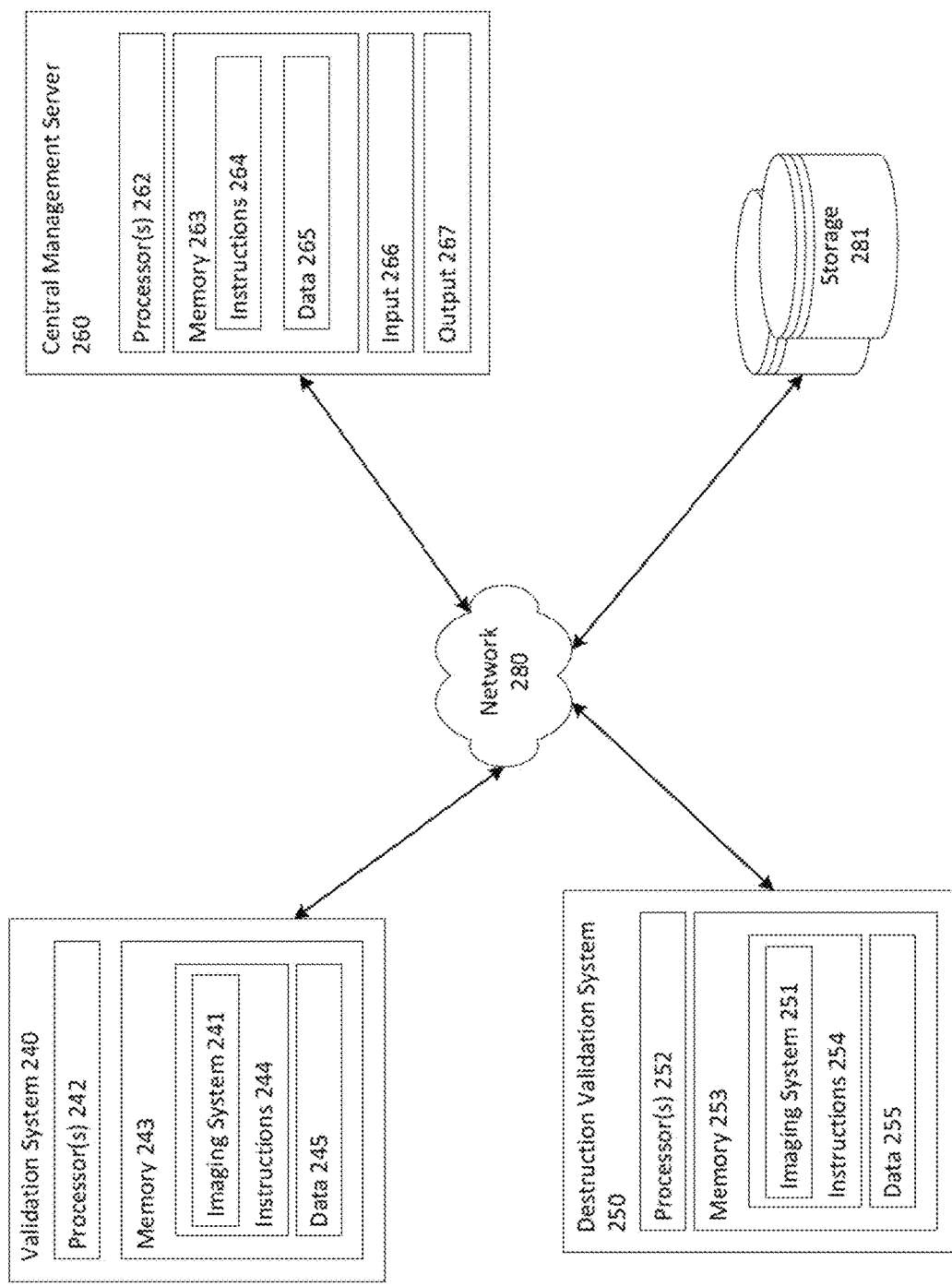
FIG. 2 is a system diagram of a validation system according to aspects of the disclosure.

FIG. 2 depicts a block diagram of an example environment for implementing a validation system 240. The validation system 240 may be similar to the validation system 100 described with respect to FIG. 1. The validation system 240 can be implemented on one or more devices having one or more processors in one or more locations. The validation system 240 is communicatively coupled to a central management server 260 over a network 280. In some examples, the central management server 260 may be a central management system. In some examples, the central management server 260 can be further coupled to a destruction validation system 250. In some examples, the validation system 240 and the destruction validation system 250 can be configured to receive and transmit data to the central management server 260 over the network 280.

The validation system 240 can include one or more processors 242 and memory 243. The memory 243 can store information accessible by the processors 242, including instructions 244 that can be executed by the processors 242. The memory 243 can also include data 245 that can be retrieved, manipulated, or stored by the processors 242. The memory 243 can be a type of non-transitory computer readable medium capable of storing information accessible by the processors, such as volatile and non-volatile memory. The processors 242 can include one or more central processing units (CPUs), graphic processing units (GPUs), field-programmable gate arrays (FPGAs), and/or application-specific integrated circuits (ASICs), such as tensor processing units (TPUs).

The instructions 244 can include one or more instructions that, when executed by the processors 242, cause the one or more processors to perform actions defined by the instructions 244. The instructions 244 can be stored in object code format for direct processing by the processors, or in other formats including interpretable scripts or collections of independent source code modules that are interpreted on demand or compiled in advance. The instructions 244 can include instructions for implementing a validation system, which can correspond to the validation system of FIG. 1. The validation system 240 can be executed using the processors, and/or using other processors remotely located from the validation system 240.

The validation system 240 also includes an imaging system 241. The imaging system comprises imaging devices and lights configured to capture images of the container. These images may be processed by processor 242 or by the central management server 260. For example, the captured images may be compared to reference images to identify empty compartments within the container, identify an identifier on objects within the container, and validate objects within the filled compartments, based on the identifier. In some examples, the results of this image processing may be stored as data 245.

The imaging system 241 may utilize imaging processing techniques. The image processing techniques may include reference image comparison and blob detection. For example, when the imaging system detects identifiers on the objects within the container, the detected identifiers are compared with known identifiers to determine if the content is a valid object. When the imaging system does not detect an identifier on the object within the compartment, the imaging system is configured to confirm that the compartment is empty. In some examples, when the imaging system does not detect an identifier within a given compartment, the imaging system may confirm that the compartment contains an invalid object.

When determining that the compartment is empty and/or contains an invalid object, the imaging system is configured to identify regions of interest (ROI) in an image of the container. Optical characteristics of the ROI may be compared with ground truth characteristics of a reference image to determine if an invalid object is present in the container. The reference image may be, for example, an image of a known empty compartment. The reference image and/or the ground truth characteristics may be stored in memory 243 of the validation system 240, memory 263 of central management server 260, and/or in storage 281. When invalid objects are detected, the validation system 240 rejects the container or provides for output a rejection notification.

The data 245 can be retrieved, stored, or modified by the processors 242 in accordance with the instructions 244. The data 245 can be stored in computer registers, in a relational or non-relational database as a table having a plurality of different fields and records, or as JSON, YAML, proto, or XML documents. The data 245 can also be formatted in a computer-readable format such as, but not limited to, binary values, ASCII, or Unicode. Moreover, the data 245 can include information sufficient to identify relevant information, such as numbers, descriptive text, proprietary codes, pointers, references to data stored in other memories, including other network locations, or information that is used by a function to calculate relevant data.

The validation system 240 can be communicatively coupled to the central management server 260 over a network 280. The network 280 itself can include various configurations and protocols including the Internet, World Wide Web, intranets, virtual private networks, wide area networks, local networks, and private networks using communication protocols proprietary to one or more companies. The network 280 can support a variety of short- and long-range connections. The short- and long-range connections may be made over different bandwidths, such as 2.402 GHz to 2.480 GHz, commonly associated with the Bluetooth® standard, 2.4 GHz and 5 GHZ, commonly associated with the Wi-Fi® communication protocol, or with a variety of communication standards, such as the LTE® standard for wireless broadband communication. The network, in addition or alternatively, can also support wired connections between the systems, including over various types of Ethernet connection.

The storage devices 281 can be a combination of volatile and non-volatile memory and can be at the same or different physical locations than the computing devices. For example, the storage devices 281 can include any type of non-transitory computer readable medium capable of storing information, such as a hard-drive, solid state drive, tape drive, optical storage, memory card, ROM, RAM, DVD, CD-ROM, write-capable, and read-only memories.

The destruction validation system 250 can also be configured similarly to the validation system 240, with one or more processors 252, memory 253, instructions 254, imaging system 251, and data 255. The central management system 260 can be configured similarly to the validation system 240, with one or more processors 262, memory 263, instructions 264, and data 265.

The imaging system 251 may include at least one imaging device, such as a camera. In some examples, the imaging system 251 may be positioned to scan or image the inside of a cabin of the destruction validation system 250. The imaging system 251 may be configured to scan objects received by the destruction validation machine. In some examples, the imaging system may scan the object for valid identifiers, to confirm the object is ready to be destroyed. In some examples, the imaging system 251 may scan the cabin of the destruction validation system 250 to ensure the object has been completely destroyed. In some examples, the imaging system 251 may provide a live feed of the cabin of the destruction validation system 250. The imaging system 251 may include a timing device. The imaging system 251 may initiate the timing device upon the activation of the destruction device. In some examples, the timing device may be used to further validate that the object in the cabin has been destroyed.

The central management server 260 may also include an input 266 and an output 267. The input 266 can include any appropriate mechanism or technique for receiving input from a user, such as a keyboard, mouse, mechanical actuators, soft actuators, touchscreens, microphones, and sensors.

The central management server 260 can be configured to display at least a portion of the received data on a display implemented as part of the output 267. The output 267 can also be used for displaying an interface between the validation system 240, the destruction validation system 250, and the central management server 260. The output 267 can alternatively or additionally include one or more speakers, transducers or other audio outputs, a haptic interface or other tactile feedback that provides non-visual and non-audible information to the platform user of the central management server 260.

The validation system 240 may access disk management protocols stored in the memory 263 central management server 260 to determine if a container has valid objects that are ready to be shipped for reuse, valid objects that are ready to be destroyed, invalid objects, or no object at all. The disk management protocols may include known identifiers, which may be associated with media within a data center. For example, an identifier, such as a barcode, QR code, or the like, may be associated with a hard drive that has been marked to be destroyed. The identifier may convey information relating to the object like the next action of the object, such a shipping action or a destruction action. The validation system 240 may use this information to direct the container to its next processing location or notify a user, such as a data center operator, of the contents of the container. For example, the system 240 may determine a container has ten valid objects ready to be shipped, five empty sections, and one invalid object. In this example, the server may generate an output 267, such as a rejection notification, to an operator within the datacenter indicating the invalid object must be removed for the container to be packaged to ship. In another example, if the validation system 240 confirms that the container has only valid objects, the validation system 240 may direct the container to its next processing location, e.g., shipping or destruction. In some examples, if the validation system 240 detects only valid objects destined to be destroyed, the validation system 240 may output a rejection notification and the container may be rejected.

Although FIG. 2 illustrates the processors and the memories as being within the systems, components described herein can include multiple processors and memories that can operate in different physical locations and not within the same computing device. For example, some of the instructions and the data can be stored on a removable SD card and others within a read-only computer chip. Some or all of the instructions and data can be stored in a location physically remote from, yet still accessible by, the processors. Similarly, the processors can include a collection of processors that can perform concurrent and/or sequential operation. The computing devices can each include one or more internal clocks providing timing information, which can be used for time measurement for operations and programs run by the systems.

Figure 3:
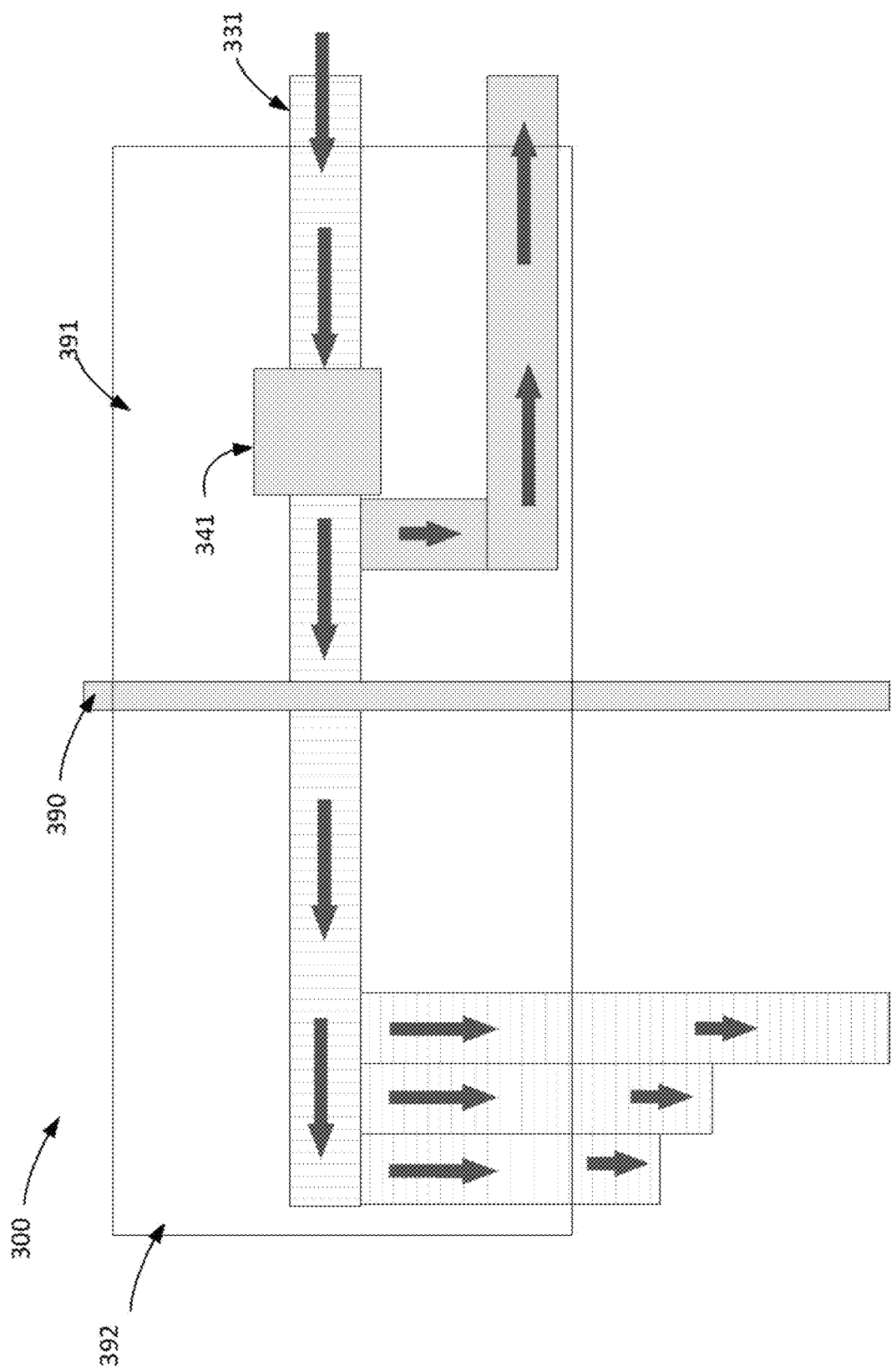
FIG. 3 is a detailed, aerial view diagram of the validation system of FIG. 1.

FIG. 3 illustrates an aerial view of an example validation system 300. Similar to the system 100 described in FIG. 1, the validation system 300 is configured to receive, transport, and process containers in a data center. The validation system 300 includes a transportation means 331 and an imaging cabin 341. The validation system 300 may be situated in a data center having a higher security area 391 and a lower security area 392 separated by a structure 390, similar to the higher security area 191 and lower security area 192 described with respect to FIG. 1.

The validation system 300 may include a transport means 331 to move containers loaded into the validation system 300 to designated areas. The transport means 331 has several routes available to the containers. The route a container takes, e.g., the route the transport means 331 moves the containers, is based on results generated by the validation system 300 during image processing of the containers. In some examples, the validation system 300 may receive input from a user, such as a data center worker, which causes the transportation means 331 to move. For example, the validation system 300 may receive a container in the higher security area 391. The validation system 300 may receive an input corresponding to instructions to begin the validation process, causing the transportation means 331 to move the container into the imaging cabin 341.

Once the container is received at the imaging cabin 341, the imaging cabin 341 may secure the container within the cabin 341. According to some examples, the container may be scanned upon entering and/or being secured within cabin 341. The scan may be automatic, e.g., captured by the validation system 300, and used to track the processing of the container. An imaging system within and/or coupled to the imaging cabin 341 may capture one or more images of the container once the container is secure in the imaging cabin 341. The images of the container may be processed to determine whether objects within the container are valid and/or invalid.

Based on the results of the imaging processing, the validation system 300 may direct the container to a designated area within the higher security area 391 or within the lower security area 392. In some examples, the valid objects may be objects intended to be reused, shipped, or destroyed. For example, if the validation system 300 determines that the objects within the container are valid objects, the container may be moved, based on the destinations of the objects, to either the lower security area 392 or another area within the higher security area 391, such as a destruction area. In an example where the objects are valid objects intended to be shipped, upon validation, the container may be routed, via the transportation means 331, to a shipping designated area in the lower security area 392. As another example, if the validation system 300 determines the container holds only valid objects ready to be destroyed, the container may be routed via the transportation means 331 to a destruction designated area in the higher security area 391. In yet another example, if the validation system 300 determines the container holds at least one invalid object, the container may be moved to a sorting designated area in the higher security area 391, such that the invalid objects may be removed from the container or otherwise corrected. By having the transportation means 331 route containers with invalid objects to a designated area within the higher security area 391, loss and/or mishandling of objects not intended to leave the datacenter is prevented.

Figure 4A:
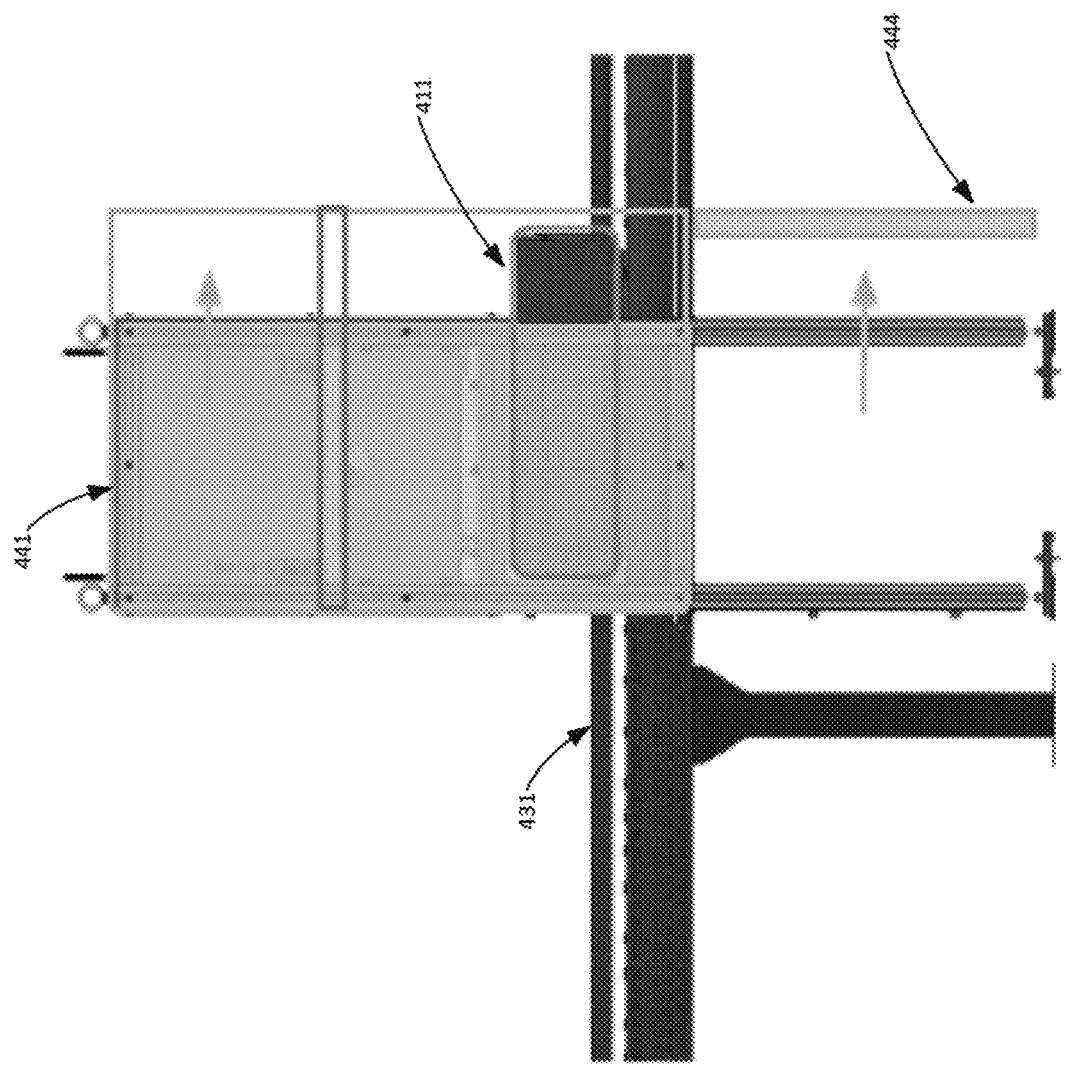
FIG. 4A is a perspective view of an example imaging cabin of the validation system processing a container according to aspects of the disclosure.
Figure 4B:
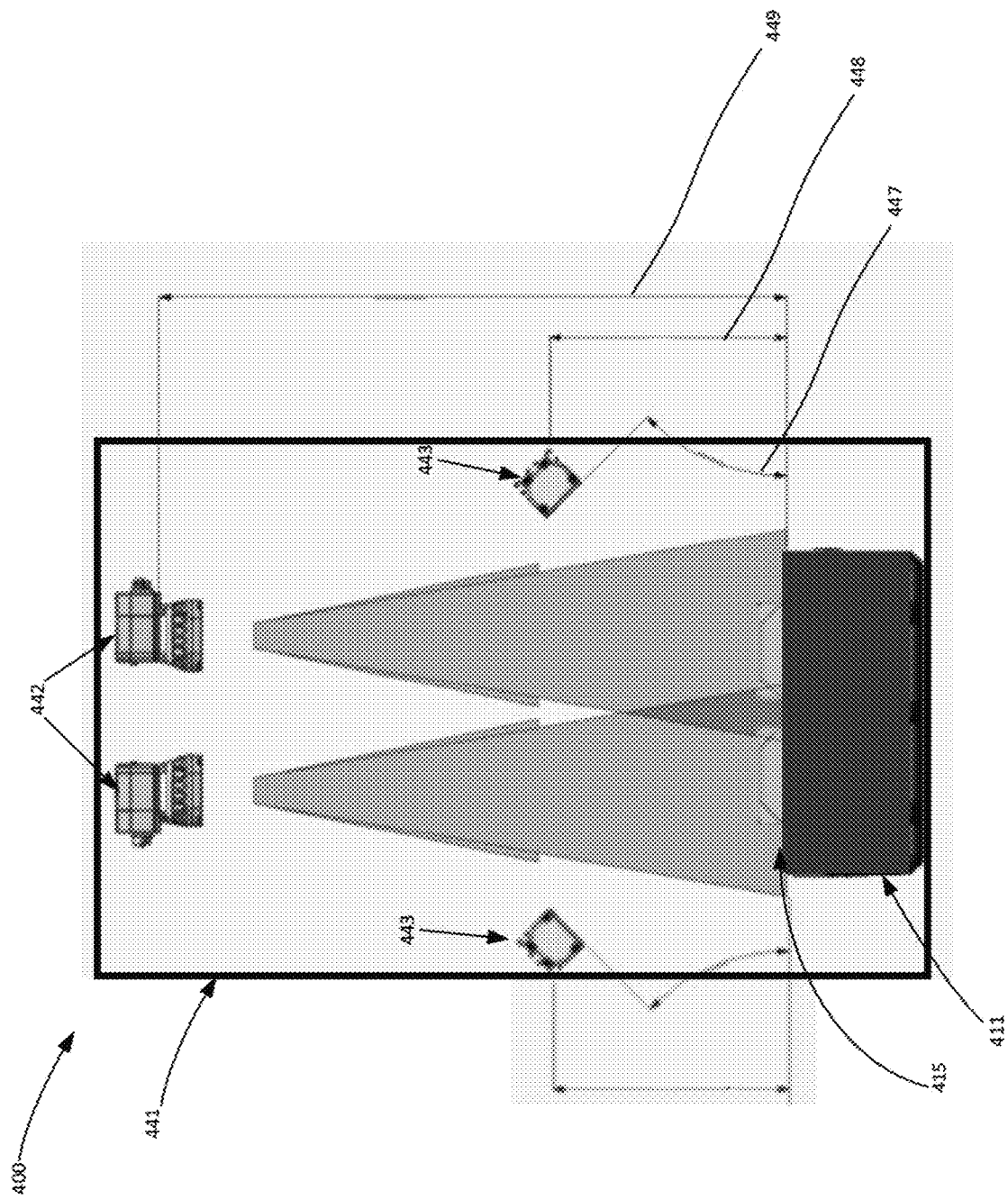
FIG. 4B is an example of an imaging system of the validation system according to aspects of the disclosure.
Figure 4C:
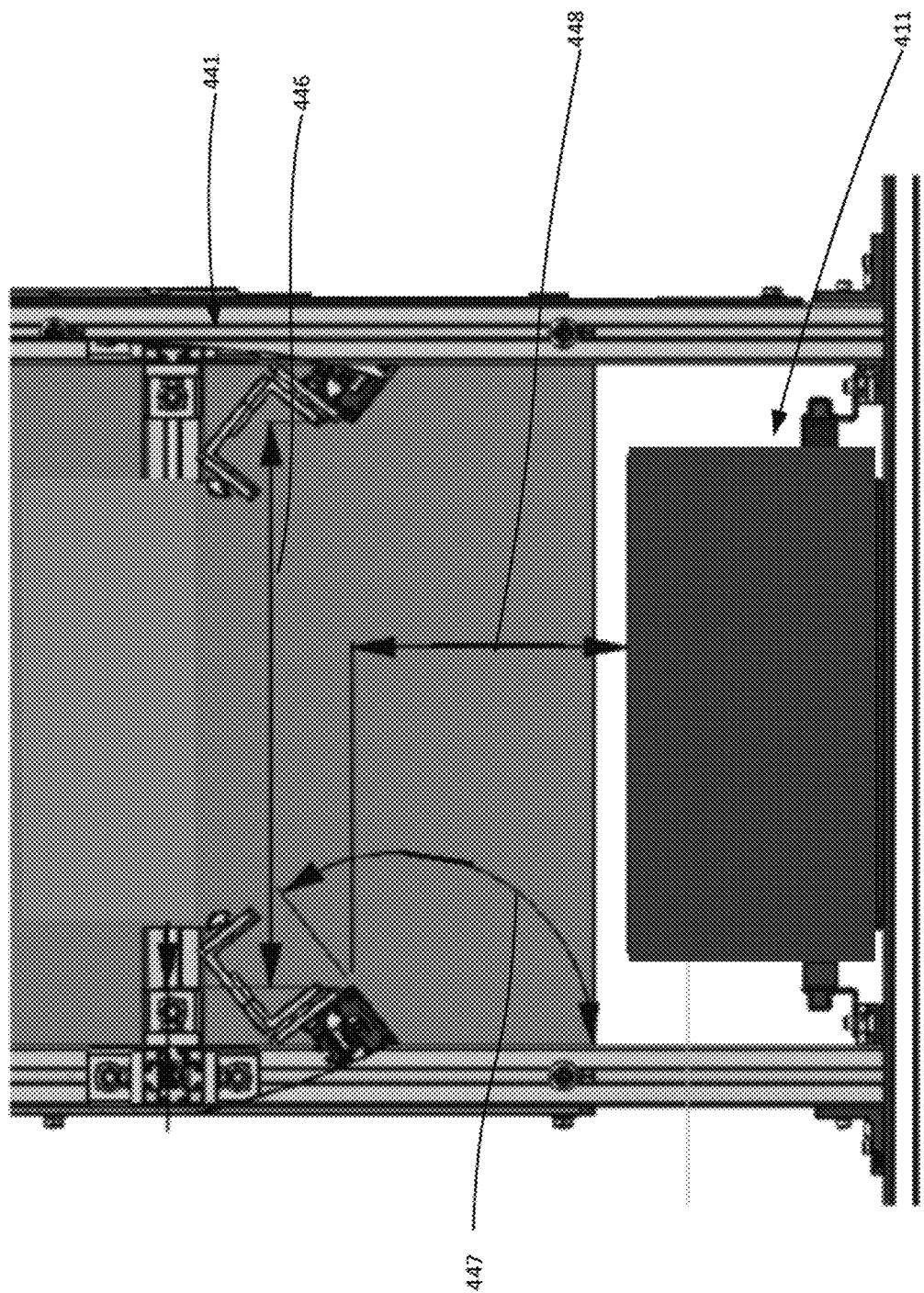
FIG. 4C is another example of the imaging system according to aspects of the disclosure.

FIG. 4A-4C illustrate various views of an example imaging system 400. The imaging system 400 is configured to capture an image of the container. The images may be processed by the imaging system 400 or another part of the system shown in FIG. 2, such as, for example, central management server 260. The images may be processed to determine whether objects within the compartments of the container are valid or invalid. In some examples, the images may be processed to confirm that compartments of the container are empty, e.g., do not have any objects within the compartments, whether valid invalid.

The imaging system 400 is configured to receive a container 411. Once the container 411 is within the imaging system 400, the imaging system 400 is configured to capture images of the container 411. For example, the imaging system 400 may comprise imaging devices 442. The imaging devices may be cameras, such as optical cameras, infrared cameras, or any other standard imagers. In some examples, there may be multiple imaging devices 442 positioned to image the container. In some examples, the imaging system may comprise an array of imaging devices. The imaging devices 442 may be positioned to capture an image of the entire container in a single image. In some examples, the imaging devices 442 may be positioned to capture a segment of the container in an image. For example, the container may be divided into a number of segments, such as quadrants. In such an example, the imaging system may have four imaging devices, each positioned to capture an optimal picture of the respective quadrant container. The images of each quadrant may be stitched together to provide a single image of the container. In some examples, each image may be provided output individually on a display. The positioning of the individual images may provide for the appearance of a single image of the container.

The imaging system 400 may include lights 443 within the imaging cabin 441. The lights 443 may be configured to illuminate the container 411 during imaging. In some examples, the light 443 may be infrared lights. The imaging system 400 may use a spectrographic setup to obtain optimal reflectivity and shading in the image of the container 411. For example, the imaging device 442 and lights 443 may be set up at a specific angle, the lighting may be diffused, and/or the system may be activated in a particular sequence, such that different lighting or imaging devices are turned on in a specific order and timing.

The inspection for identifiers is actually done using the light 443 closest to the side to be validated, since a direct overhead light may introduce glare and can affect identifier reading. In some examples, each light bank may be activated independently and to the exclusion of other lights when inspecting for absence of material on each side of the cabin, i.e. right light for right side and left light for left side. In some examples, to inspect for absence of material, both the side light and an overhead light are turned on, activated independently for left and right. With both turned on, there is adequate lighting to inspect inside slots within the container. In some examples, the overhead light may be turned on in sequence with the side lights. For example, after each side is inspected for absence with light, an overhead multispectral/white light is used to inspect for presence and identifiers. This is to prevent shadows cast from the opposite side from negatively influencing results of the side currently under inspection. The contrast ratio for barcodes is superior with direct white light than indirect infrared.

According to an aspect of the disclosure, an example workflow of capturing an image of the container may include the following sequence of steps. A first image is taken to inspect for identifiers. For this image, each infrared light is activated independently on each side of the cabin. The alternating light activation is to prevent shadows cast from the opposite side from negatively influencing results of the side currently under inspection. Additionally, the use of the indirect light eliminates glare on identifier codes, which can be introduced with direct overhead lighting.

Following the same example, once the identifiers are captured, a second image is captured to inspect for absence. This image utilizes both the external, indirect infrared light banks, as well as integrated infrared lighting within the camera. These are also both activated independently on each side of the machine, due to the same reason as outlined above. The reason for using both lights is to introduce a high intensity environment that allows light to enter deeper areas of slots within the tote, to enable absence detection. In addition, glare isn't an issue here as we are not reading identifiers. In some examples, the lighting sequence will be the same, i.e. in the same timing and pattern, for all imaging.

In some examples, the imaging device 442 and the lights 443 may be adjustable to alter the angle at which the image is captured or which the light beam is directed. The lights 443 may be configured to allow for easy identification of objects within the container 411, whether valid or invalid.

The imaging system 400 may be housed in an imaging cabin 441. The imaging cabin 441 may be located at a predetermined position along and/or on a transportation means 431 of the validation system. The imaging cabin 441 may be configured to only allow one way movement through the imaging cabin 441. For example, the imaging cabin 441 may allow for a container to enter at one end and leave at another end. In some examples, the imaging cabin 441 includes an opening at one end to allow for the container 411 to be advanced into the imaging cabin 441 by the transportation means. After the container 411 is positioned within the imaging cabin 441, the opening is closed, thereby restricting the container 411 to the imaging cabin 441. In some examples, by closing the opening of the imaging cabin 441 once the container 411 is positioned within the imaging cabin 441, access to the container 411 is restricted, thereby preventing any human tampering with the objects within the container.

As depicted in FIG. 4A, the imaging cabin 441 may have a sliding door 444 or that allows for the container 411 to enter and/or pass through the imaging cabin 441. While shown as a sliding door 444, the opening may be closed using any means, such as a rotating door, accordion style door, flap, or the like. The sliding door 444 may be closed during imaging of container 411. After the images are captured and processed, the sliding door 444 may be opened. In some examples, there may be multiple doors on the imaging cabin 441. Based on the image processing, a given door may be opened. For example, if, after image processing, the validation system determines that the objects in the container are valid, a first door leading to a first route on the transportation means 431 may open. In such an example, the first route may move the container 411, via the transportation means 431, to a shipping designated area. In another example, if, after image processing, the validation system determines that at least one object within the container is invalid, another door leading to a second route on the transportation means 431 may open.

FIG. 4B-4C illustrate example configurations of the imaging system 400. The imaging cabin 441 may be configured to receive containers to be processed by the validation system. As shown, the imaging cabin 441 is substantially a rectangular prism. However, the imaging cabin 441 may be of any shape and size for housing the imaging system 400 and receiving the container. For example, the imaging cabin 441 may have a width that is at least wide enough for the container to be positioned within. The imaging cabin 441 may have a height that allows for the imaging system 400 to be positioned within and able to capture an image of the container.

As illustrated in FIG. 4B, the imaging device 442 and the lights 443 may be affixed and/or removably coupled to the imaging cabin 441 at a first height 448 and a second height 449, respectively. The first and second heights 448, 449 are measured from roughly the top surface of the area in which objects need to be detected. In some examples, the heights may be measured from the highest point of the container, i.e. either the top surface 415 of the container 411 the top of the tallest object in the container 411. The total height of the imaging cabin 441 is greater than the larger of the first height 448 or the second height 449. In some examples, the first height 448 may be between 150-300 millimeters (mm). In some examples the first height 448 may be between 225-325 mm from the surface of the container. This height will increase or decrease as a function of the container or base height of the object to be detected. These measurements may be highly dependent on the object to be detected and specific for this particular type of light and set of objects we are detecting. This range and or nominal dimensions might vary widely if the objects differ. In some examples, the first height 448 may be between 200-250 cm. In some examples, the second height 449 may be between 500-700 mm. In this particular example, the height 449, referred to as the working height, needs to be 712 mm+/−2 mm just based on all of the factors involved. The height 449 can vary widely depending on the media that needs to be read the identifier, the overall size of the container such as length by width by height of the container, the type of camera, and the type of lens selected. The range of height for other instances of the scanning system may be quite large. In some examples, the length of height 448 will be less than height 449. In some examples, the second height 449 may be between 640-670 mm. The heights and ranges of heights provided herein are just some examples of what the heights could be and are not intended to be limiting. The heights may, in some examples, be determined based on the imaging devices, lights, and/or other components within the imaging cabin 441. The lengths should be in mm. The values are heavily dependent on the specifications of the image device being used, as well as the object/identifier to be inspected.

The first height 448 may be at a position high enough to illuminate the entire container with light beams from the lights 443. In some examples, the second height 449 may be a position high enough to capture the entire container 411 in a single image. In other examples, the second height 449 may be at a position high enough to capture a segment of the container 411. In some examples, the imaging cabin may have components, such as brackets or holders, configured to accept the imaging devices 442. The holders may be positioned a distance 446 apart, as shown in FIG. 4C. The distance 446 may be equal to or greater than the width of the container 411. The distance 446 may be equal to or less than the width of the imaging cabin 441. According to some examples, the distance 446 may be between 300-500 mm. In some examples, the distance 446 may be 420-450 cm.

The imaging device 442 is angled at angle 447. The angle 447 may be, for example, between 40-60 degrees. In some examples, the angle 447 may be less than 40 degrees or greater than 60 degrees, depending on the location of the imaging device 442 within the imaging cabin 441 as compared to the container 411. The angle 447 may be adjusted for each container depending on various parameters, such as size of the container, positioning of the container, direction of the light beans for the lights 443, or other parameters that may affect the image captured by the imaging device 442.

Figure 5A:
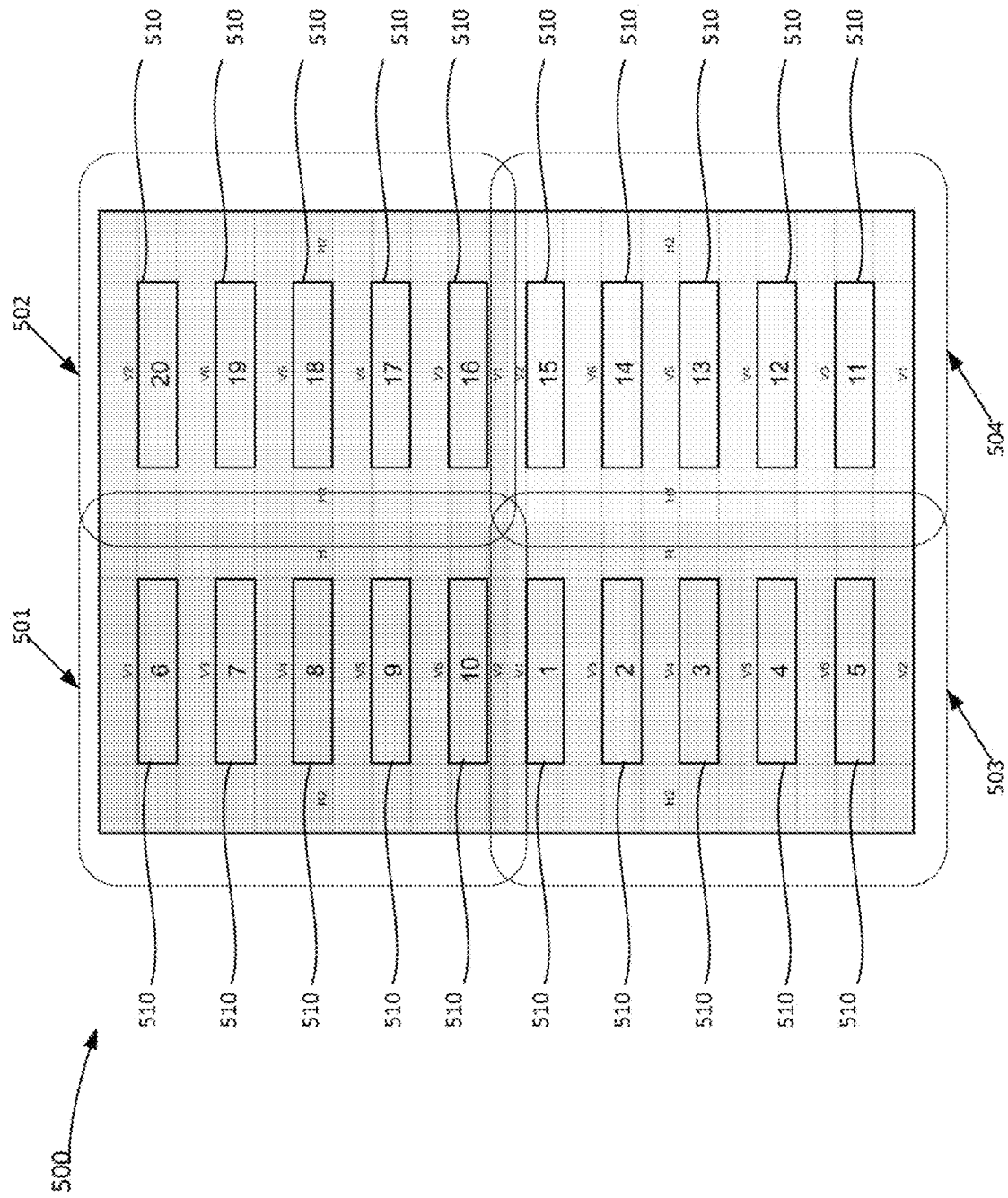
FIG. 5A is a schematic diagram of an example container according to aspects of the disclosure.
Figure 5B:
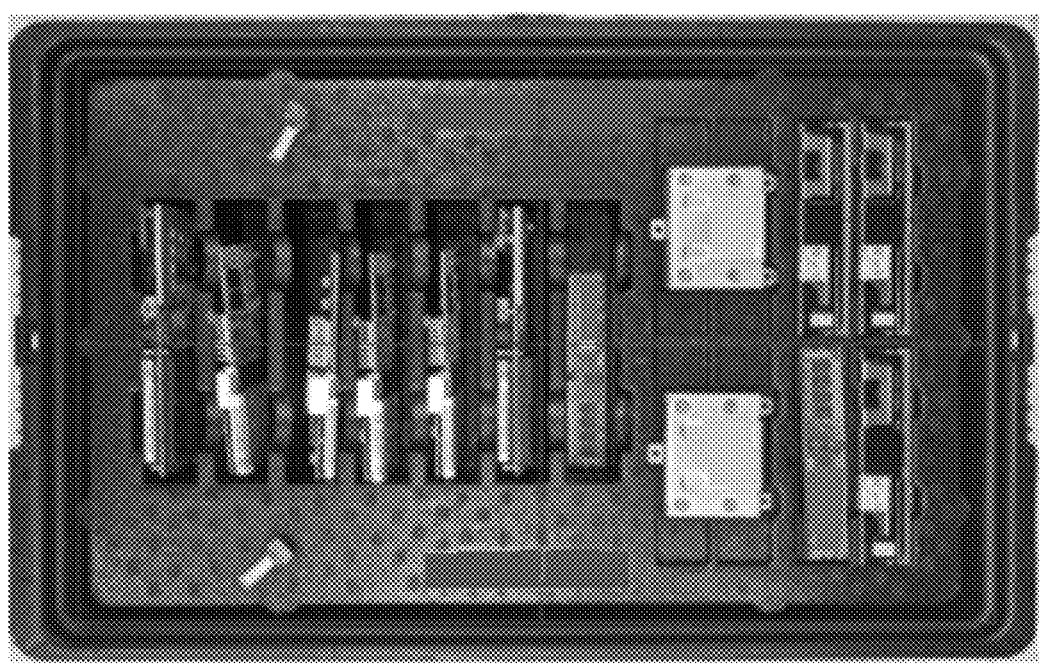
FIG. 5B is an example of a segmentation of a container according to aspects of the disclosure.

FIGS. 5A-5B illustrate an example container that has been segmented. The container 500 may be segmented into portions, such as quadrants. The imaging system, such as the imaging system 400 in FIG. 4, may capture images of each segment of the container 500, the entire container 500, or a combination thereof.

According to some examples, the container 500 may include compartments configured to receive objects to be processed by the validation system. The objects may be, for example, disks, hard drives, memory devices, or the like. In some examples, the compartments may be sized to fit the type of object to be processed by the validation system. In some examples, the compartments may be of equal size, regardless of the type of object to be processed. In some examples, the compartments may be varying sizes. As depicted in FIG. 5B, the container 501 may have compartments of varying sizes, configured to accept various types of objects.

The compartments of the containers may be sized based on the objects to be reused and/or destroyed. The objects intended to be reused and/or destroyed may include an identifier. The addition of another object below or next to the object to be reused and/or destroyed may cause the identifier to be undetectable by the imaging system. For example, the addition of another object in the compartment may cause the identifier to be no longer in focus, e.g., the identifier on the object to be reused and/or destroyed may no longer be at a predetermined height or distance from the imaging system. In some examples, the other object may be placed in a compartment intended to be empty. In such an example, the imaging system can detect that there is an invalid object in that compartment. Additionally or alternatively, if the other object has an identifier, the comparison of the identifier associated with the other object to the list of identifiers associated with objects intended to be reused and/or destroyed would indicate that the other object is an invalid object.

The validation system employs imaging processing techniques to analyze the images captured by the imaging system. The segmentation of the container to facilitate quicker and/or more efficient image processing. For example, referring to FIG. 5A, the container may be segmented into four quadrants 501-504, with each quadrant having five slots 510. The imaging system may capture an image of each quadrant. In some examples, a single image of the container may be captured and divided into the four quadrants. Each quadrant may be processed individually. The imaging processing system is able to use less computational resources and more quickly analyze the four quadrants, rather than twenty slots individually.

Figure 6:
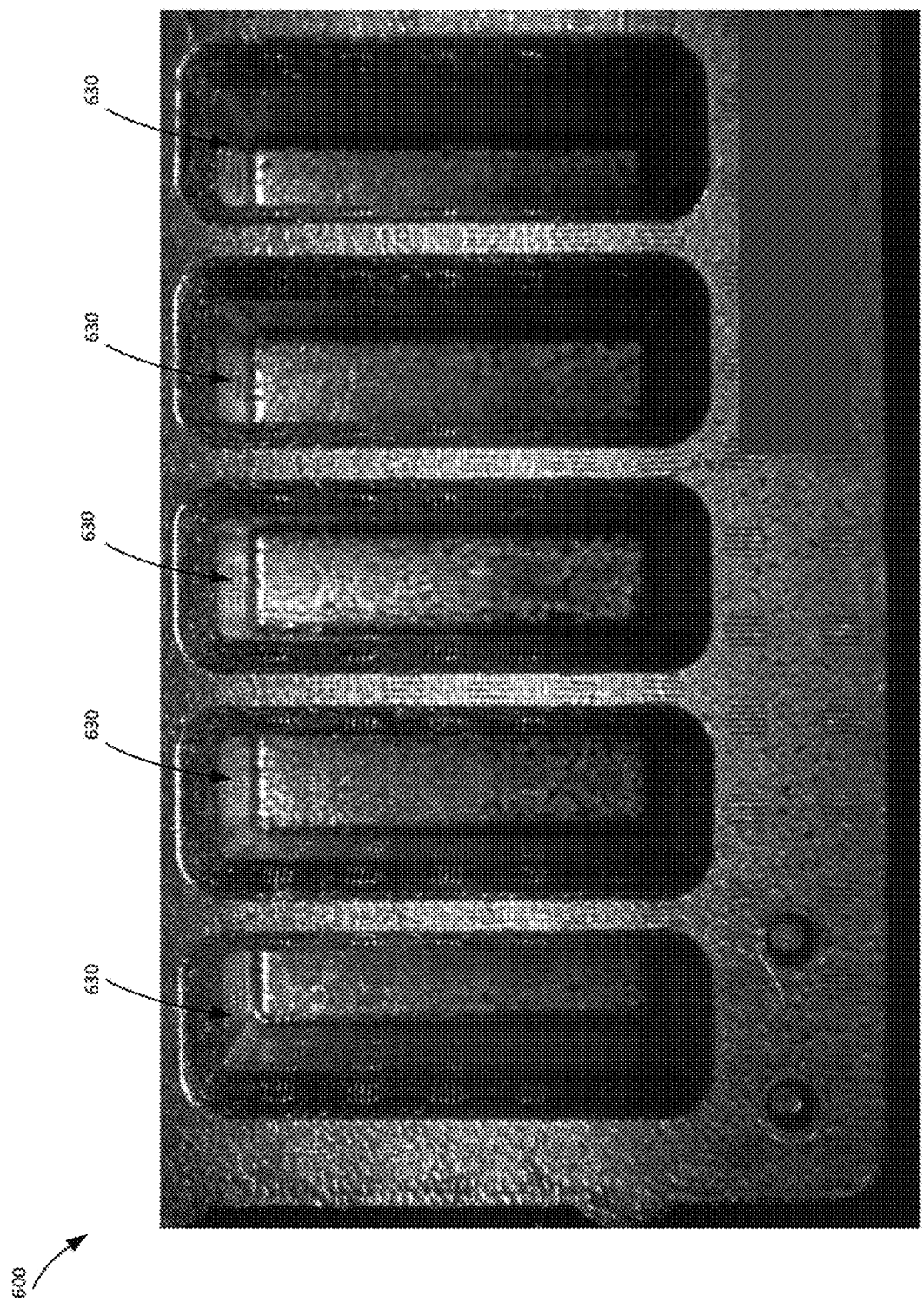
FIG. 6 is an example of a portion of the container of FIG. 5A according to aspects of the disclosure.

In some examples, the validation system and/or imaging system may process the captured images using imaging processing techniques, such as reference image comparison. The system may compare the captured image of the container to a reference image of the container. FIG. 6 is an example reference image 600 to serve as the ground truth for image processing comparison purposes. Reference image 600 illustrates a ground truth image for a segment, e.g., quadrant, of the container. In some examples, there may be a reference image for each segment of the container. In another example, the reference image may be of the container. The reference image may include a corresponding number of empty compartments 630 as the container or segment of the container. The captured image of the container may be compared to the reference image as part of the image processing.

The reference image includes ground truth characteristics that serve as a baseline for the image processing. To aid in more efficient image processing, the containers may be coated in a specific color or finish. For example, the container may be coated in a matte black finish, such that objects, contents, disks, and media within the slots of the container, whether valid or invalid, are easily discernible by the system. The color or finish of the containers may be input into the central processing server or the validation system as a ground truth characteristic. In some examples, the ground truth characteristics, such as color, finish, markings, of the reference image may be extrapolated from the reference image. The color, finish, and markings may be used to determine a baseline brightness, pixel intensity, or the like when comparing the captured image to the reference image.

Figure 7A:
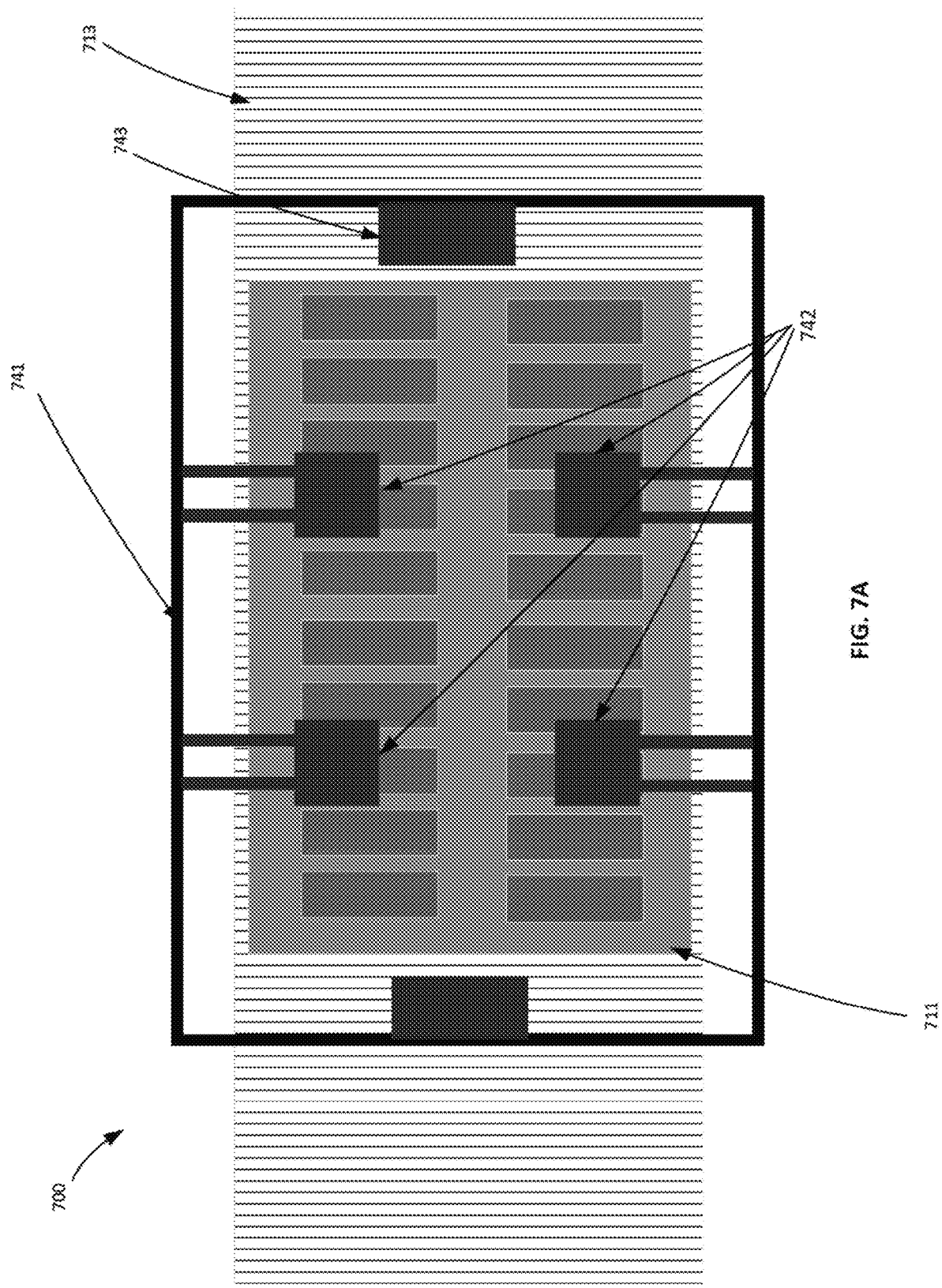
FIG. 7A is an aerial view of the imaging cabin of the validation system according to aspects of the disclosure.
Figure 7B:
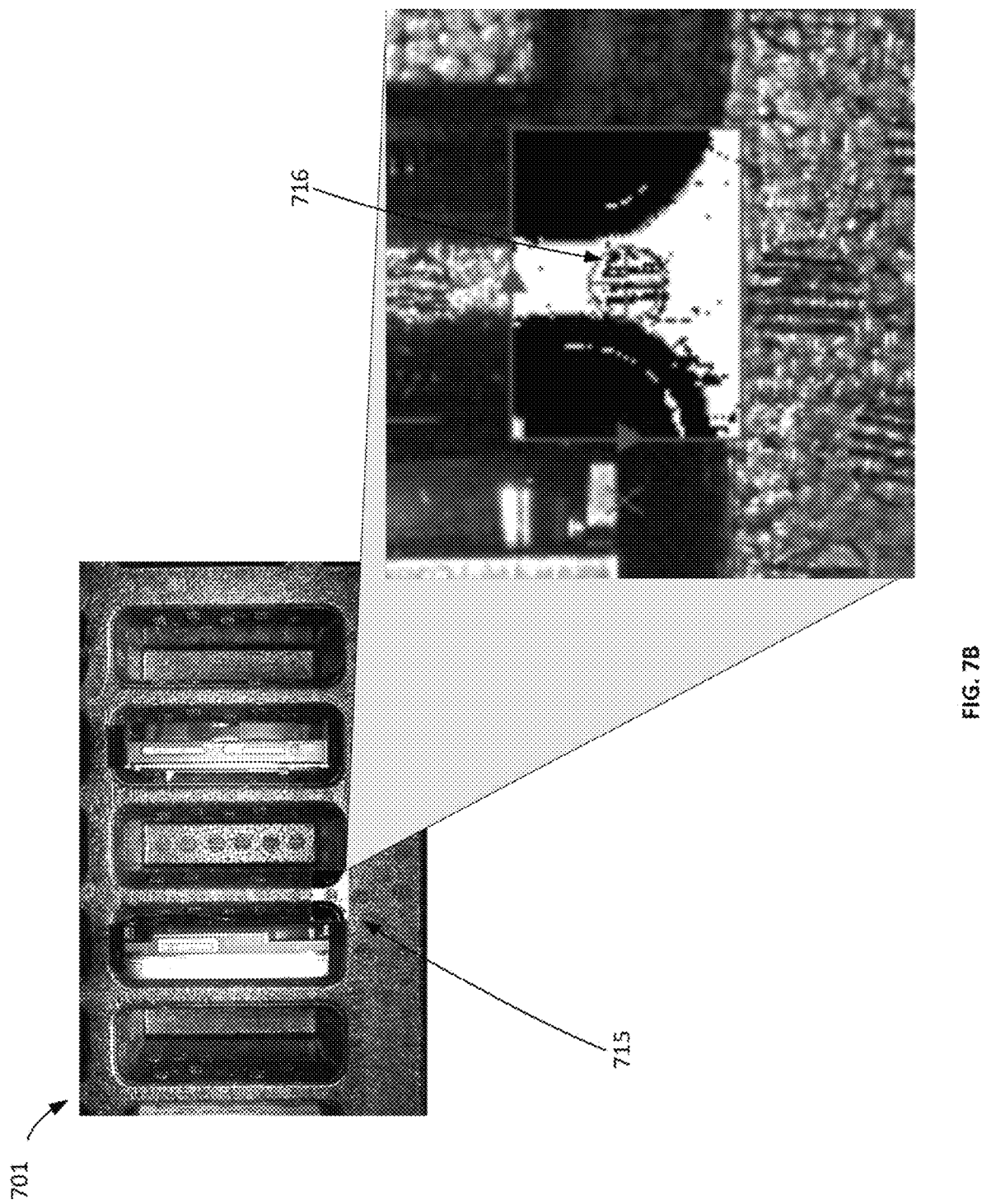
FIG. 7B is an example of alignment features of a container according to aspects of the disclosure.

FIG. 7A-7B illustrates example portions of the imaging processing method. In FIG. 7A, depicts an aerial view of the imaging system 700. A container 711 may be transported into an imaging cabin 741 of a validation system via transportation means. The imaging cabin 741 includes the imaging system 700, including the imaging devices 742 and lights 743, which may be similar to imaging devices 442 and lights 443 described in relation to FIGS. 4A-4C.

The imaging system 700 may capture images of the container 711. When the validation system uses reference image comparison to analyze or process the captured image of the container 711, the imaging system 700 may adjust the position of the container 711 within imaging cabin 741 and/or adjust the position of the imaging device 742. The position of the container 711 and/or the imaging device 742 may be adjusted to align the orientation of the container within the captured image with the orientation of the container within the reference image. For example, if the reference image was taken of an empty container that was four inches from the sliding door of the imaging cabin 741, the imaging system 700 may adjust the placement of the container 711, via the transportation means 713, to be four inches from the sliding door of the imaging cabin 741. Further, the imaging system may adjust the container 711 to align the segments of the container 711 with the segments of the reference image. In some examples, the system may have a maximum allowable position tolerance of no more than about 4 millimeters. In an example where there are imaging devices set up to capture a quadrant of the container, the imaging system may adjust each imaging device individually to correspond to, or mirror, the set up for the reference image. In some examples, the lighting may be adjusted independently to match the conditions of the reference image. For example, the imaging system 700 may adjust the position of the container 711 or the lights 743 to correspond to the lighting of the reference image at each segment of the container. By correcting and/or adjusting the orientation and lighting of the container in the captured image to correspond to the orientation and lighting of the container in the reference image, the image processing is more efficient as a more direct comparison can be made between the captured image and the reference image. For example, additional image processing of the captured image, e.g., rotating, color correcting, etc., is negated by having the orientation and lighting of the container in the captured image correspond to the orientation and lighting of the container in the reference image.

In some examples, the orientation of the container in the captured image may be aligned with the orientation of the container in the reference image using visible markings common to the container and the reference image. For example, the container may have markings outside of the slots to serve as landmarks for the imaging processing. The markings may be, for example, a symbol near or relative to a given slot of the container. The markings may be used when comparing the captured image of the container to a reference image. Further, in some examples, ground truth characteristics may be used to align the captured image and the reference image. In terms of lighting, the reference image may be retaken for each device, such that it may have varying lighting conditions due to environmental/external factors.

FIG. 7B illustrates the identification of a marker used to align the container 701 with a reference image. For example, the validation system may, before and/or after capturing an image of the container, identify markings on a given section of the container, such as section 715 containing marking 716, The validation system may compare the markings on the container to markings on a reference image of the container to orient and align the container and/or captured image with the reference image. According to some examples, if the image of the container has not been captured yet, the container may be rotated or otherwise moved to align with the orientation of the container in the reference image. In examples where the image of the container has been captured, the captured image may be rotated or otherwise transformed to align with the reference image.

Once the image of the container has been aligned with the reference image, the validation system may proceed to validate objects within the container using image processing techniques such as reference image comparison, blob detection, or histogram analysis. For example, the validation system may be trained and/or configured to identify changes in pixels. The changes may include, for example, intensity, brightness, or the like. The changes may be small amounts of light. The changes may be a signal to the validation system an object is present. In some examples, the changes may be a signal to the validation system that the object is a valid object and/or an invalid object.

Figure 8:
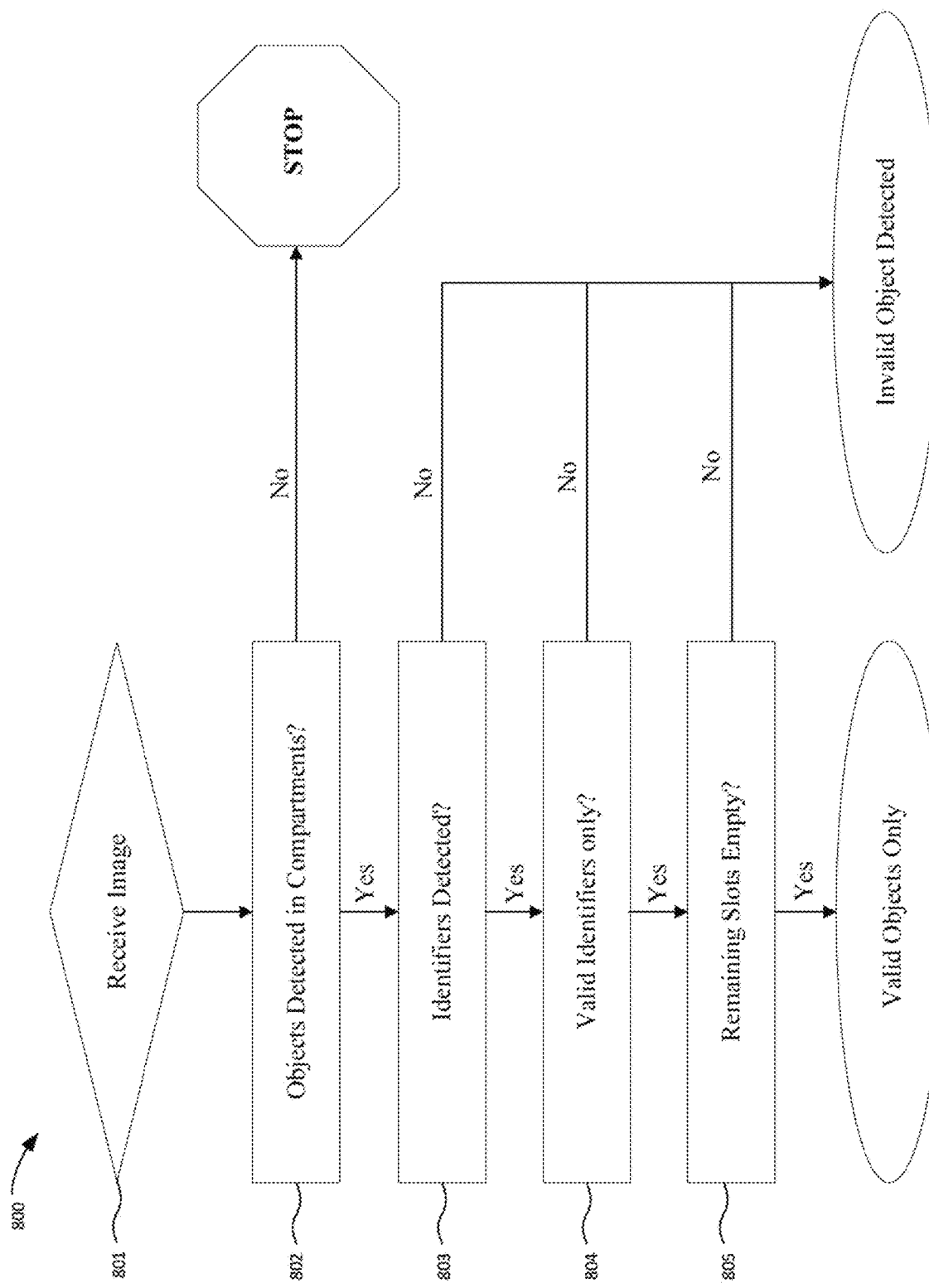
FIG. 8 is an example flow chart of an example method of image processing of the containers by the validation system according to aspects of the disclosure.

FIG. 8 depicts a flow chart 800 showing an example validation process. The following operations do not have to be performed in the precise order described below. Rather, various operations can be handled in a different order or simultaneously, and operations may be added or omitted.

In block 801, the validation system captures and/or receives an image of a container within the imaging cabin. The container may have a plurality of objects within a plurality of compartments. According to some examples, before the image of the container is captured, the container may be received and adjusted, e.g., oriented, by an imaging system according to examples of this disclosure.

In block 802, the system will determine if any objects are present in the container. According to some examples, the system will compare the captured image to the reference image to determine if there are objects detected in the compartments. For example, the validation system may compare the captured image of the container to a reference image to determine a delta between the two images. For example, the system may compare the optical characteristics of the captured image to the ground truth characteristics of the reference image to determine the delta. The optical characteristics and the ground truth characteristics may relate to elements of the images, such as light, color, shape, size, intensity, number of pixels, etc. In some examples, the elements may be quantified as numerical values.

The delta may correspond to a numerical value associated with the difference between optical characteristics of the captured image and the ground truth characteristics of the reference image. In some examples, the numerical value of the delta may be on a scale between zero to one. The numerical value of the delta may be compared to a threshold. The threshold may correspond to a tolerance of difference between the captured image and the reference image. For example, some differences between the captured image and the reference image may be negligible or due to a system error such that the differences can be ignored. If the numerical value of the delta is greater than a threshold, the system may determine that the container needs more detailed image processing. However, if the numerical value of the delta is less than the threshold, the system may determine that the container can proceed to the next processing step, e.g., shipping or destruction. In some examples, the threshold may be 0.2. In some examples, the threshold may be parameters from a range of manufacturers, wherein the parameters are empirically set for the type of media being inspected.

If, based on the comparison, the system determines the optical characteristics of the captured image of the container have no difference from the ground truth characteristics in the reference image, the system may determine that no objects are present in a given slot of the container and/or any of the slots in the container. In this example, the delta between the captured image and the reference image may be zero or less than the threshold. Further, the system may understand the zero score to mean the slot of the container is empty, thus there is no need for further image processing.

FIG. 9A-9I are example results 900-907 of the image comparison process by the validation system. The results 900-908 may include the container image 910-918, a result panel 920, and a status indicator 924. In some examples, the results panel 920 is not output to the user or a user interface. Instead, the results panel 920 may be for internal use by the system, such that the results are piped directly to software pipelines upstream through protos. The results panel 920 may output or produce results in chronological order of the image processing.

On the result panel 920, the system may generate either a negative indication 922 or a positive indication 923. The negative indication 922 may indicate the system detected an invalid object. An invalid object may be an object that is not properly displaying an identifier, an object that is missing an identifier, an object with an identifier that does not match a known identifier, a foreign object, or any other object not registered with the central management server in communication with the validation system. In some examples, the result panel 920 may initially output a negative indication 922 as an artifact of the system starting up, such that the first output is a signal that the system has been triggered awake. The positive indication 923 may indicate the system did not detect invalid objects. A positive indication 923 may also indicate that only valid objects were detected in the container. In some examples, the positive indication may be a check mark, a circle, a green mark, or any other suitable mark. In some examples, the negative indication may be an X mark, a line, a dash, a red mark, or any other suitable mark.

Figure 9A:
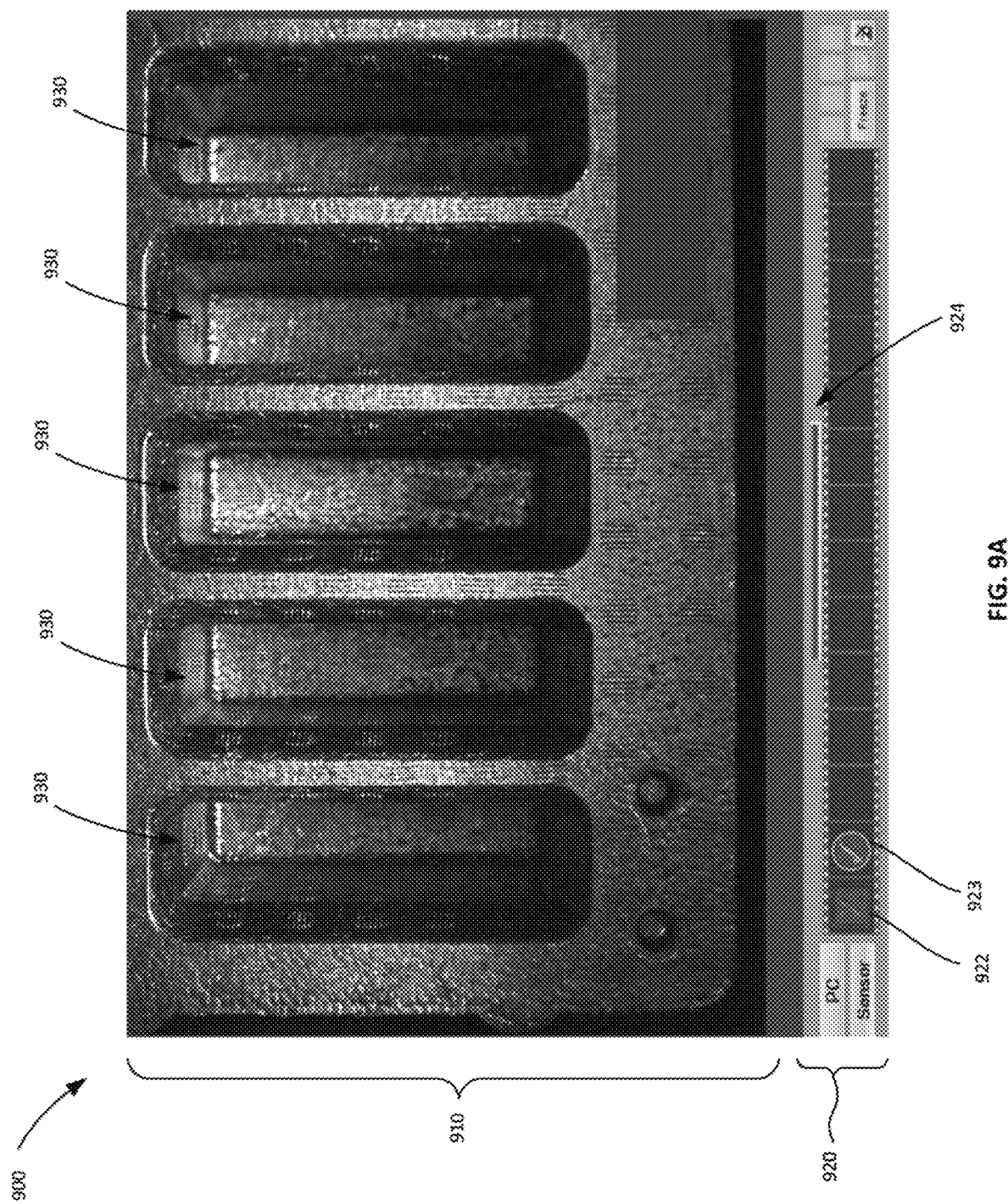
FIG. 9A is an example result of the imaging processing of an image by the validation system according to aspects of the disclosure.

FIG. 9A illustrates example results 900 of a comparison of a captured image 910 to a reference image, such as reference image 600 of FIG. 6. The comparison yields a delta of zero or below the preset threshold. The system may determine that the compartments of the container in image 910 are empty compartments 930. The system will output a positive indication 923 on the results bar 920. In this example, the image would require no further processing. In some examples, a positive indication 923 at this step would require the barcodes from the valid objects to be sent to a central database that contains the status of each object.

This initial scan and processing of the captured image conserves processing resources by reducing the area of the captured image that needs in depth image processing. For example, by determining which slots are empty, the system reduces computational resources and network overhead by preventing further imaging processing related to those slots. Moreover, the system can quickly determine which slots of the container are empty and mark them as such.

Referring to FIG. 8, in block 803, if the system determines that there are objects in the compartments of the container, the system may determine if the objects have identifiers. According to some examples, when there is a difference between the reference image and the captured image, the system may seek to determine whether an identifier is detectable. The system may detect an area with a delta value above the threshold. This area will be further examined by the system. The system will scan the area for an identifier. The identifier may be, for example, a bar code or a QR code on the object in the slot. If the identifier is visible in the captured image, the system may isolate the identifier. The detected identifier may be associated, by the processors of the system, with the object in the compartment or with that region of the container. For example, if an identifier is detected in or near the first slot of the container, the system may associate that identifier with the first slot and/the object(s) within the slot. When the system detects an area with a delta value above the threshold and does not detect an identifier, the system may determine an invalid object is present.

Figure 9B:
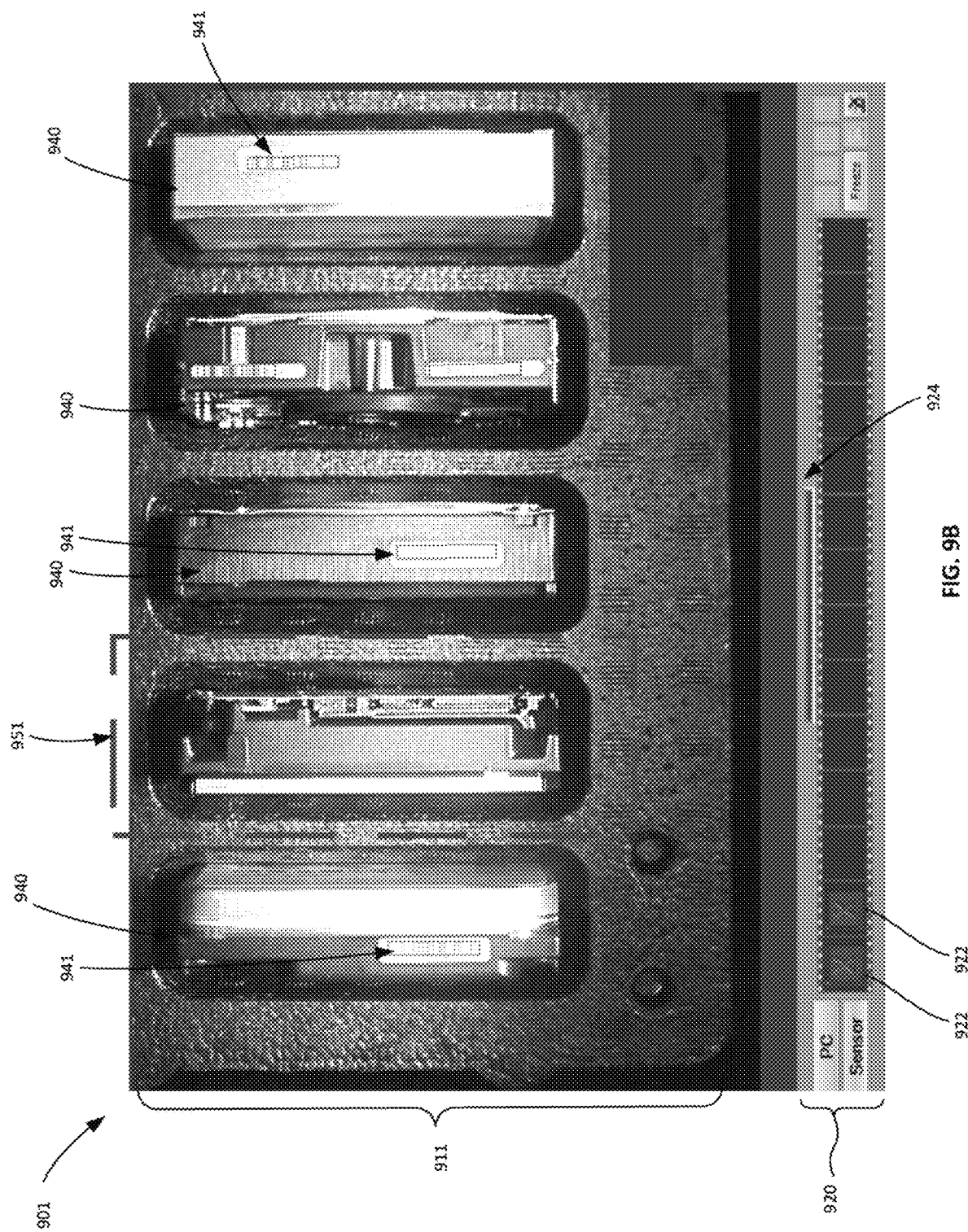
FIG. 9B is another example result of the imaging processing of an image by the validation system according to aspects of the disclosure.

FIG. 9B illustrates example results 901 of a comparison of a captured image 911 to a reference image. The container of the captured image 911 has five slots. The validation system may determine and/or detect, based on image processing, that four of the slots contain an object 940 with valid identifiers 941. The validation system may detect area 951 as a slot in which the object within the slot is lacking an identifier. The validation system may provide as output negative indicators 922 in the results bar 920 on a user interface. In some examples, the container of image 911 may be rejected by the validation system and moved to a sorting area for repositioning and/or removal of the invalid object.

Figure 9C:
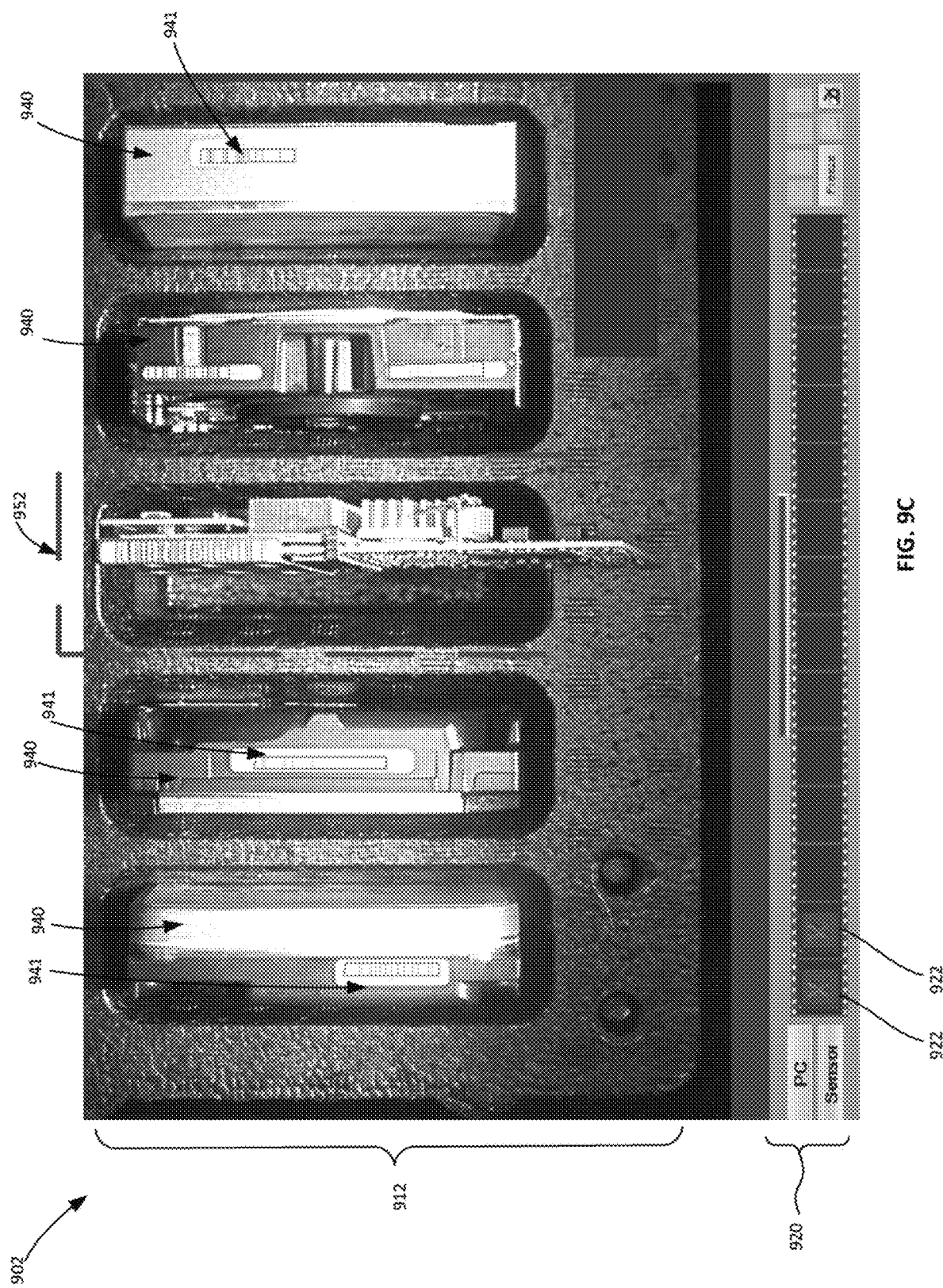
FIG. 9C is another example result of the imaging processing of an image by the validation system according to aspects of the disclosure.

FIG. 9C illustrates another example result 902 of a comparison of a captured image 912 to a reference image. In the container of the captured image 912, the validation system may have detected valid objects 940 with valid identifiers 941 in four of the five slots. In area 952, the validation system may detect an object without an identifier. In some examples, the invalid object may be a foreign object that does not fit into the shape of the slot. The object may be determined to be invalid based on a lack of valid identifier, the wrong shape or size, or the like. The validation system may provide as output negative indicators 922 in the results bar 920. In some examples, the container in captured image 911 may be rejected by the validation system and moved to a sorting area for the foreign object to be removed and/or repositioned.

In some examples, when the system detects an invalid object, the system may reject the container or output a negative indication. An invalid object may trigger the end of the image processing. In some examples, the system may direct the container to a sorting area for the object to be repositioned or removed.

Referring to FIG. 8, in block 804, the validation system may determine if the detected identifiers are valid. When the validation system detects an identifier, the validation system may compare the detected identifier to known identifiers. In some examples, the known identifiers may be stored in a storage of a central management system, similar to the central management server 260 of FIG. 2. The known identifiers convey to the validation system whether the object associated with the detected identifier is a valid object or an invalid object. The known identifiers may encode data relating to the status of the disk, including ready to ship, ready to be destroyed, still in use, etc.

Figure 9D:
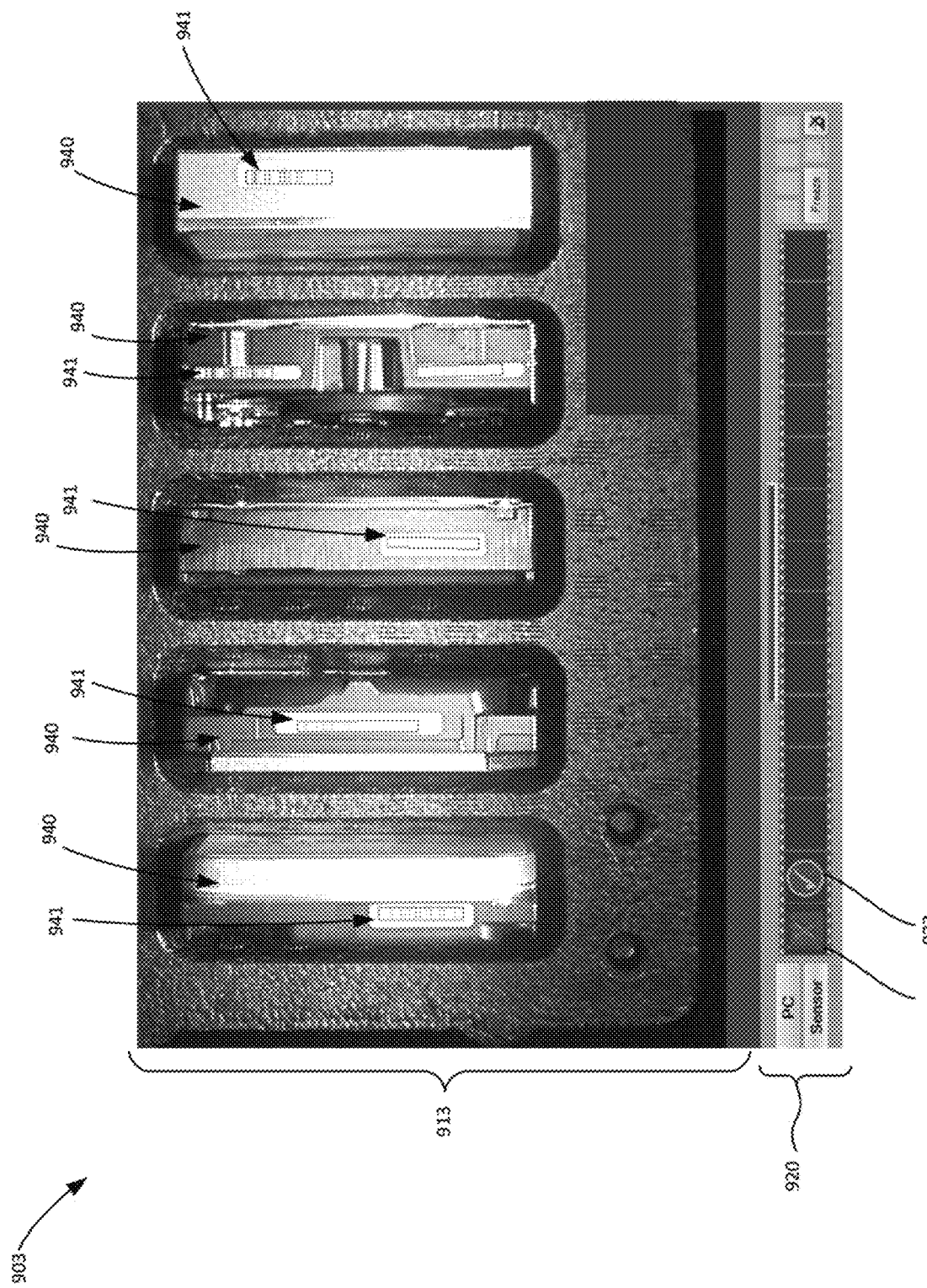
FIG. 9D is another example result of the imaging processing of an image by the validation system according to aspects of the disclosure.

If the detected identifier matches a known identifier, the validation system may determine that the object is a valid object. Based on the object being a known object, and its identifier, the validation system may determine whether the object is ready to ship, be reused, or ready to be destroyed. For example, the detected identifier may provide an indication to the validation system that the object associated with the identifier has been marked for shipping. As depicted in FIG. 9D, the validation system has processed the captured image 913, by comparing it to a reference image, to yield results 903. The validation system detected five valid objects 940, each with valid identifiers 941. The results bar 920 may include a positive indicator 923 indicating that the container contains only valid objects. In such an example, the container may be moved to another area of the system for further processing, e.g., shipping, reuse, or destruction. In some examples, the valid objects would require further processing, such as a subsequent step of checking the status of these objects. The system may not move the container prior to confirming the status of the valid objects at the central management system. When the system receives a confirmation that the container's valid objects are only objects to be shipped, the system sends the container to another area of the system. If instead the central management system confirms that one of the objects is marked for destruction, the system will either reject or send the container to another area, but remains within the same security layer.

Figure 9E:
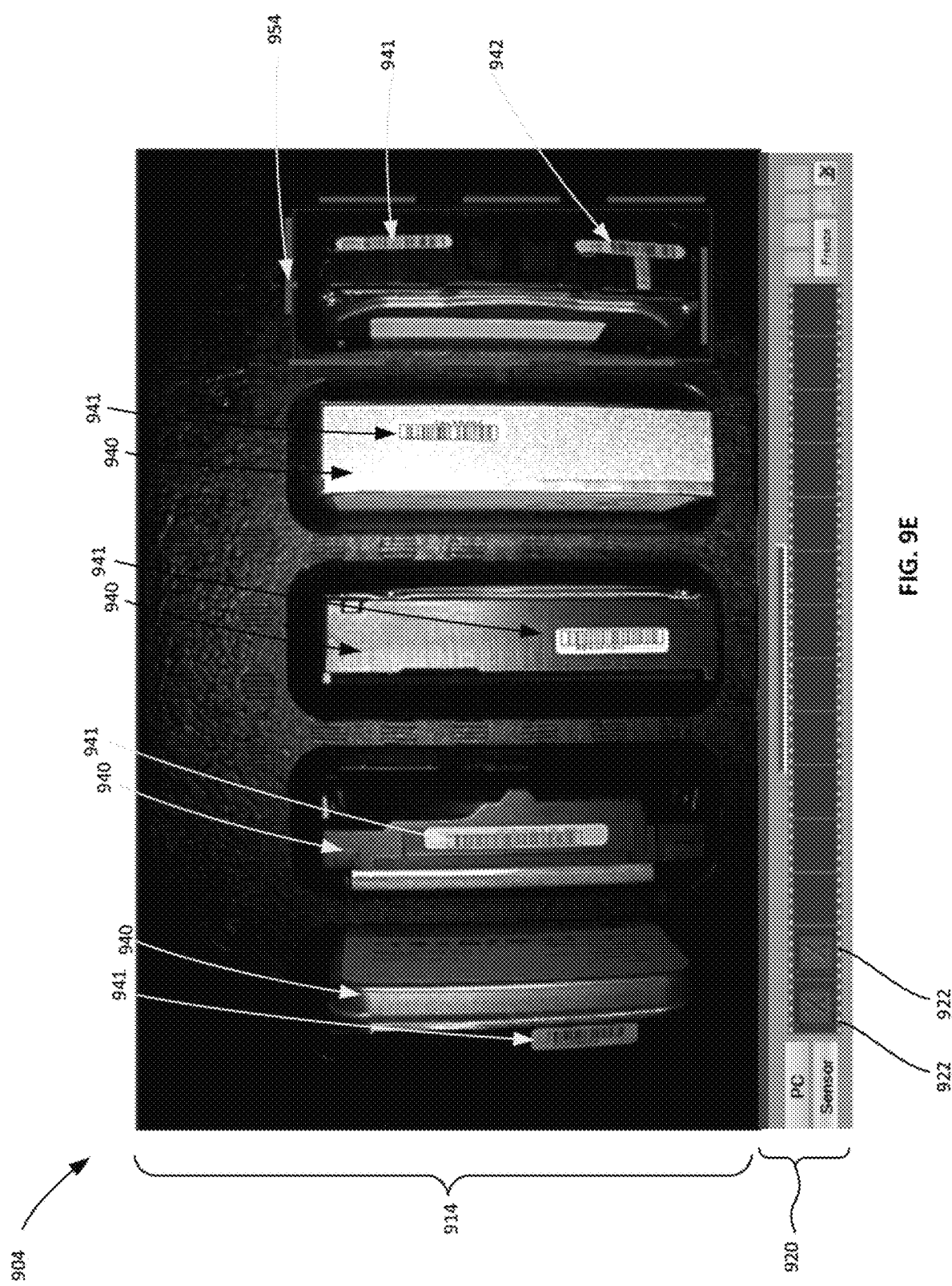
FIG. 9E is another example result of the imaging processing of an image by the validation system according to aspects of the disclosure.

FIG. 9E illustrates another example result 904 based on a comparison of captured image 914 to a reference image. In results 904, the validation system had detected five objects in five slots. The validation system may identify five valid identifiers 941 were detected in image 914. However, as shown, the system further detected an invalid identifier 942 on the object in area 954. The validation system may provide as output one or more negative indicators 922 in the results bar 920. Based on the negative indicators 922, the container within captured image 914 may be rejected by the validation system and moved to a sorting area.

Referring back to FIG. 8, in block 805, the validation system may confirm remaining compartments do not contain any object, i.e., the remaining slots are empty. For example, the validation system may detect, based on a difference between the reference image and the captured image, the presence of an object in the slot but may determine that the object does not have an identifier. In such an example, the comparison of the reference image and the captured image may be used to detect foreign objects, such as invalid objects, in the slots of the container. For example, if no identifier is detected and a threshold difference has been reached, the system may mark that area of the container image as a region of interest (ROI) that requires more detailed image processing to determine whether the slot is empty or if there is an invalid object within the slot. In some examples, the threshold is the same as with the initial image processing. In some examples, a different threshold may be set for the more detailed image processing. For example, a more stringent threshold may be applied to ensure the ROI contains no objects. According to an aspect of the disclosure, the steps described in relation to block 802 and block 805 may happen concurrently.

To determine whether the slot is empty or if there is a foreign object, e.g., invalid object, in the slot, the captured image may be further processed using blob detection and/or histogram evaluation. In some examples, the histogram and blob detection are happening concurrently. Blob detection may include an algorithm for detecting continuous pixels that have a relationship to each other based on contrast, brightness, intensity, or the like. The blob may be, for example, an object and/or piece of object, within the slot. By detecting a blob within the slot, only the blob portion of the captured image may be further processed, thereby increasing the efficiency of the validation system. For example, the efficiency of the system may be increased by using less resources, e.g., processing and network overhead, by processing only specific portions of the captured image as compared to processing the whole image.

According to some examples, blob detection and histogram evaluation may be performed as part of the image processing. In some examples, a presence of an object is only determined if both histogram and blob detection yield true. In some examples, the presence of an object is determined if either histogram or blob detection yields true. Histogram evaluation may include determining a total number of different pixels between the reference image and the container image and detecting peak values in that range. For example, a histogram value may be a peak value, such as peak brightness, contrast, intensity value, for continuous pixels. A peak histogram value may indicate that an object or a part of an object is present. The peak can be easily detected due to the background of the captured image provided by the container, e.g., matte black.

The system may process the ROI using the image processing techniques and compare the ROI with the ground truths of the reference image.

After further processing the captured image, if the ROI did not produce a delta above the threshold, the validation system may validate the remaining compartments as being empty. In examples where the validation system identifies valid objects and empty compartments, the validation system may provide as output a positive indication the container is ready to move to another designated area. In some examples, the other designated area may be a shipping area or a destruction area. For example, if the system has validated that all of the detected items in the container are destined to be shipped and no invalid objects are present, the container may be moved to the shipping area of a data center.

Figure 9F:
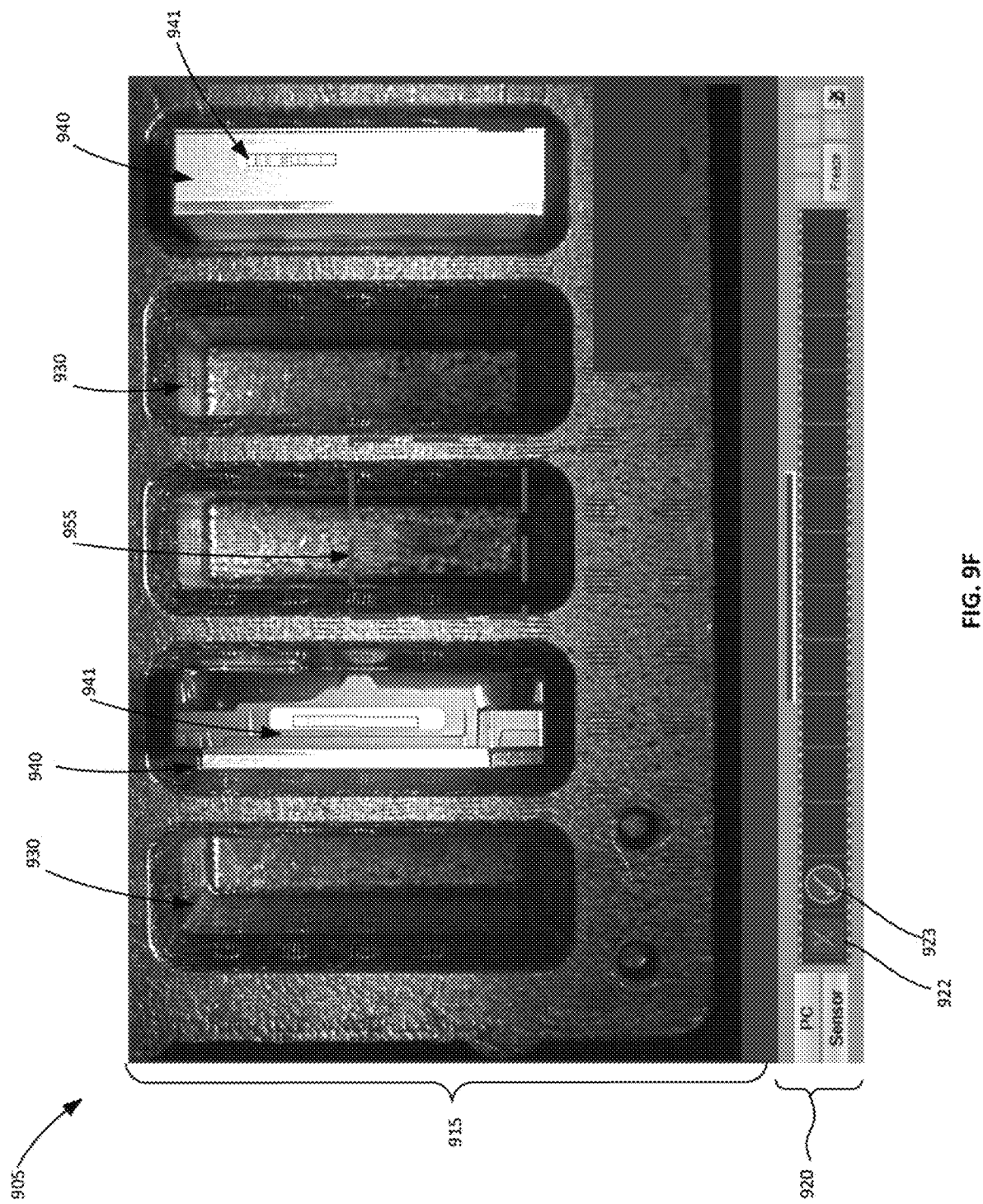
FIG. 9F is another example result of the imaging processing of an image by the validation system according to aspects of the disclosure.

FIG. 9F illustrates example results 905 based on a comparison of captured image 915 and a reference image. The validation system may detect two empty compartments 930 and two valid objects 940 within the captured image 915. The valid objects 940 may have valid identifiers 941, e.g., identifiers that match a known identifier. The validation system may identify ROI 955. For example, the validation system may identify ROI 955 as being different from the same region in the reference image. In this example, the ROI 955 may contain a slight variation in the container from the reference image. The validation system may further process the ROI 955 using blob detection and/or histogram evaluation. The blob detection may be used to identify a specific area of the ROI 955 to further processing using histogram evaluation. For example, blob detection may be used to detect contiguous pixels within ROI 955 that have a relationship based on contrast, intensity, brightness, or the like. The detected blob may be further processed using histogram evaluation to identify maximum, minimum, and/or average values of the total number of differential pixels. Based on the histogram analysis, the validation system may determine whether a foreign object, e.g., an invalid object, is in the ROI 955. For example, if the histogram values are above a threshold, the validation system may determine that a foreign object is within the ROI 955. In examples where the histogram values are below the threshold, the validation system may determine that the ROI 955 is void of any objects. In FIG. 9F, the results 905 may indicate that ROI 955 did not contain an invalid object, e.g., the compartment is empty. The validation system may provide as output a positive indicator 923 in the results bar 920. In some examples, the container in captured image 915 may be moved to a shipping or destruction area, based on the information from the identifiers 941.

If after performing blob detection and/or histogram evaluation, the validation system determines a delta for the ROI above the threshold, the validation system may identify the ROI as having an invalid object. Upon identifying an invalid object, the validation system may reject the container. In some examples, based on the rejection of the slot due to the identification of an invalid object, the system may provide for output a rejection notification to the user.

Figure 9G:
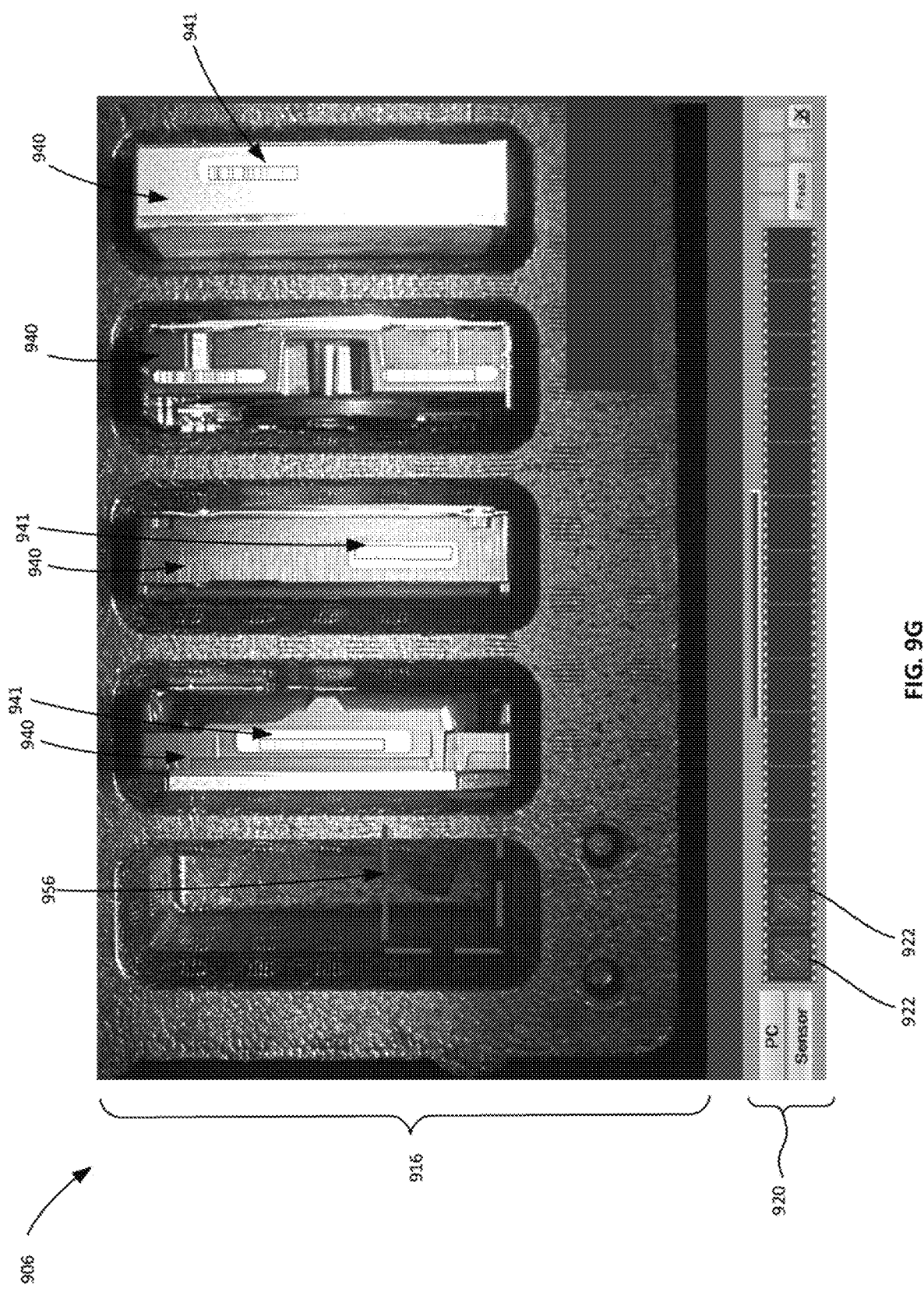
FIG. 9G is another example result of the imaging processing of an image by the validation system according to aspects of the disclosure.

FIG. 9G illustrates example results 906 based on a comparison on captured image 916 and a reference image. The validation system may detect four valid objects 940 with valid identifiers 941 on each object within the captured image 916. The system may also identify ROI 956. ROI 956 may contain a foreign object. The validation system may further process the ROI 956 using blob detection and/or histogram evaluation. In FIG. 9G, the validation system has determined, based on the blob detection and or histogram evaluation, ROI 956 contains a foreign object. The validation system may provide as output negative indicators 922 in the results bar 920. In some examples, the container of captured image 916 may be rejected by the validation system and moved to a sorting area for the foreign object to be removed.

According to some examples, the validation system may process areas or sections of the captured images beyond the boundaries of the compartments of the container. For example, the validation system may process areas of the captured image determined to be outside of the compartments but within the bounds of the container using the image processing techniques disclosed above and herein. For example, the validation system may detect a ROI outside the boundaries of the slots but along the side of the. The validation system may perform blob detection to determine whether to further perform a histogram evaluation. Based on the image processing, if the ROI produces a delta above the threshold, the container may be rejected, or a negative indication may be provided for output to the user.

Figure 9H:
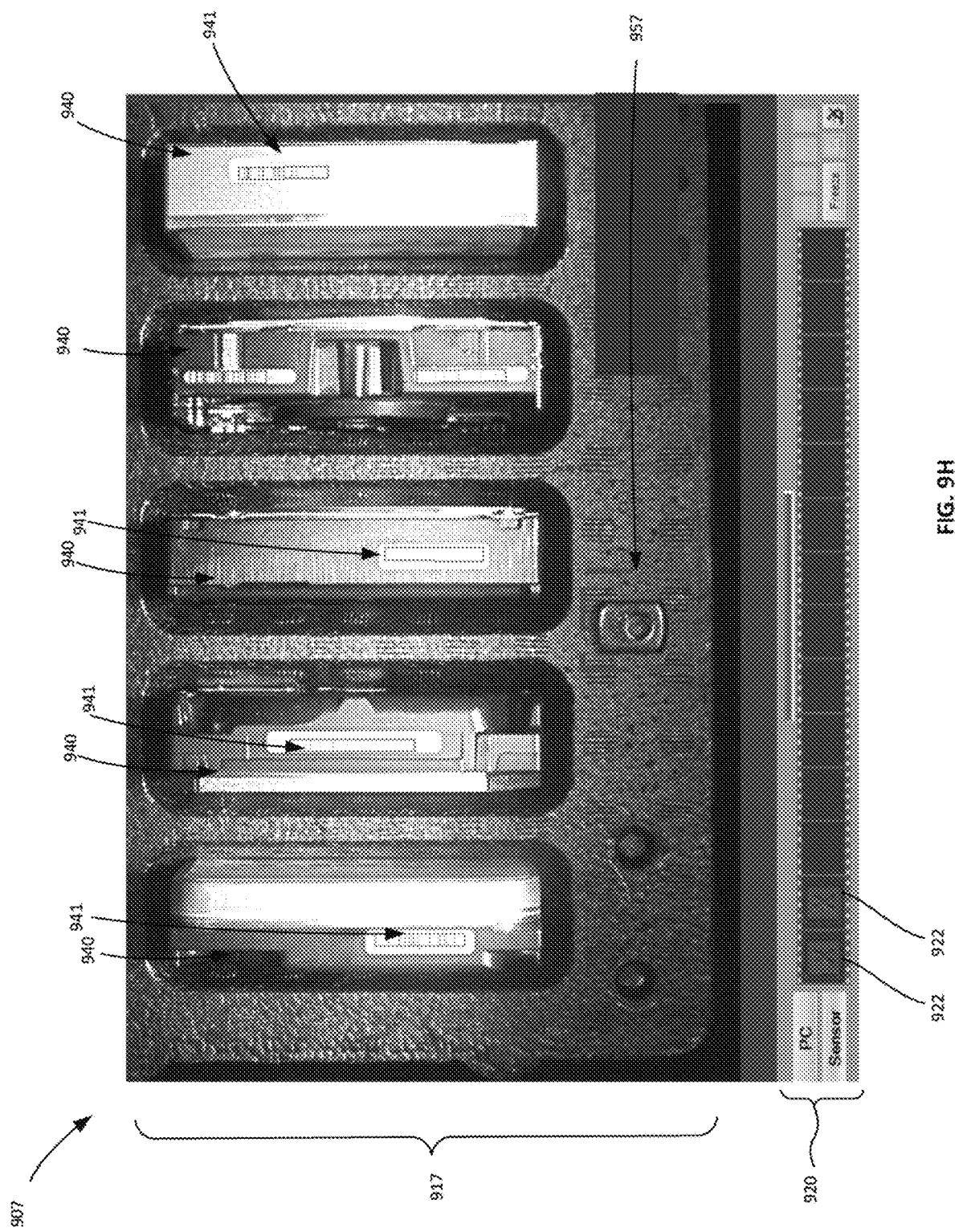
FIG. 9H is another example result of the imaging processing of an image by the validation system according to aspects of the disclosure.

FIG. 9H illustrates another example result 907. The validation system may detect five valid objects 940, each with valid identifiers 941. The results 907 may identify a ROI 957 in an area adjacent to the compartments. According to some examples, the ROI 957 may be identified based on a difference in the captured image to the reference image. The differences may be a visual difference, e.g., the presence versus the absence of an object, or a more granulated difference, e.g., differences in pixel colors, brightness, intensity, or the like. In examples where the validation system identifies a ROI 957, the validation system may perform blob detection and/or histogram evaluation to determine whether the ROI contains an invalid object. As shown in FIG. 9H, the ROI 957 contains a foreign object. However, based on the more detailed image processing, the system may detect the foreign object as a non-negligible difference between image 917 and the reference image. The validation system may provide as output negative indicators 922 in the results bar 920. In some examples, the container of image 917 may be rejected by the validation system and moved to a sorting area.

Figure 9I:
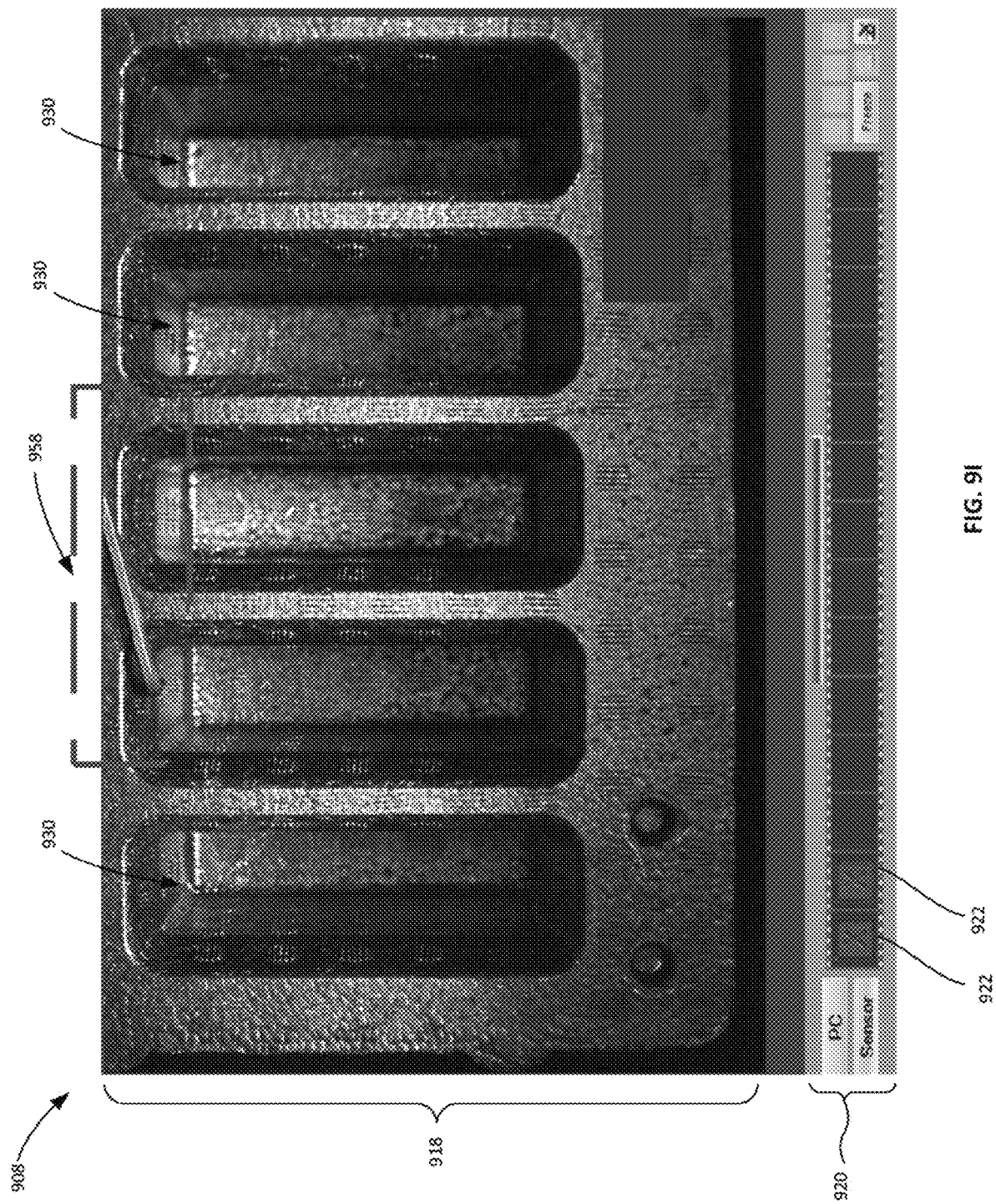
FIG. 9I is another example result of the imaging processing of an image by the validation system according to aspects of the disclosure.

In some examples, the ROI may overlap over more than one compartment or segment of the container. For example, as shown in FIG. 9I, in a container of image 918 with five slots, the system may detect an invalid object in slots 2-3, in ROI 958. FIG. 9I illustrates example results 908 of a comparison of a captured image 918 to a reference image. In this example, the system may mark slots as containing an invalid object and reject the container or output a negative indication 922 to the user.

Though the examples above describe the image processing occurring to the container as a whole, in some examples, the image processing may focus on portions of the container, a portion of the container, and/or one compartment at a time.

Figure 10:
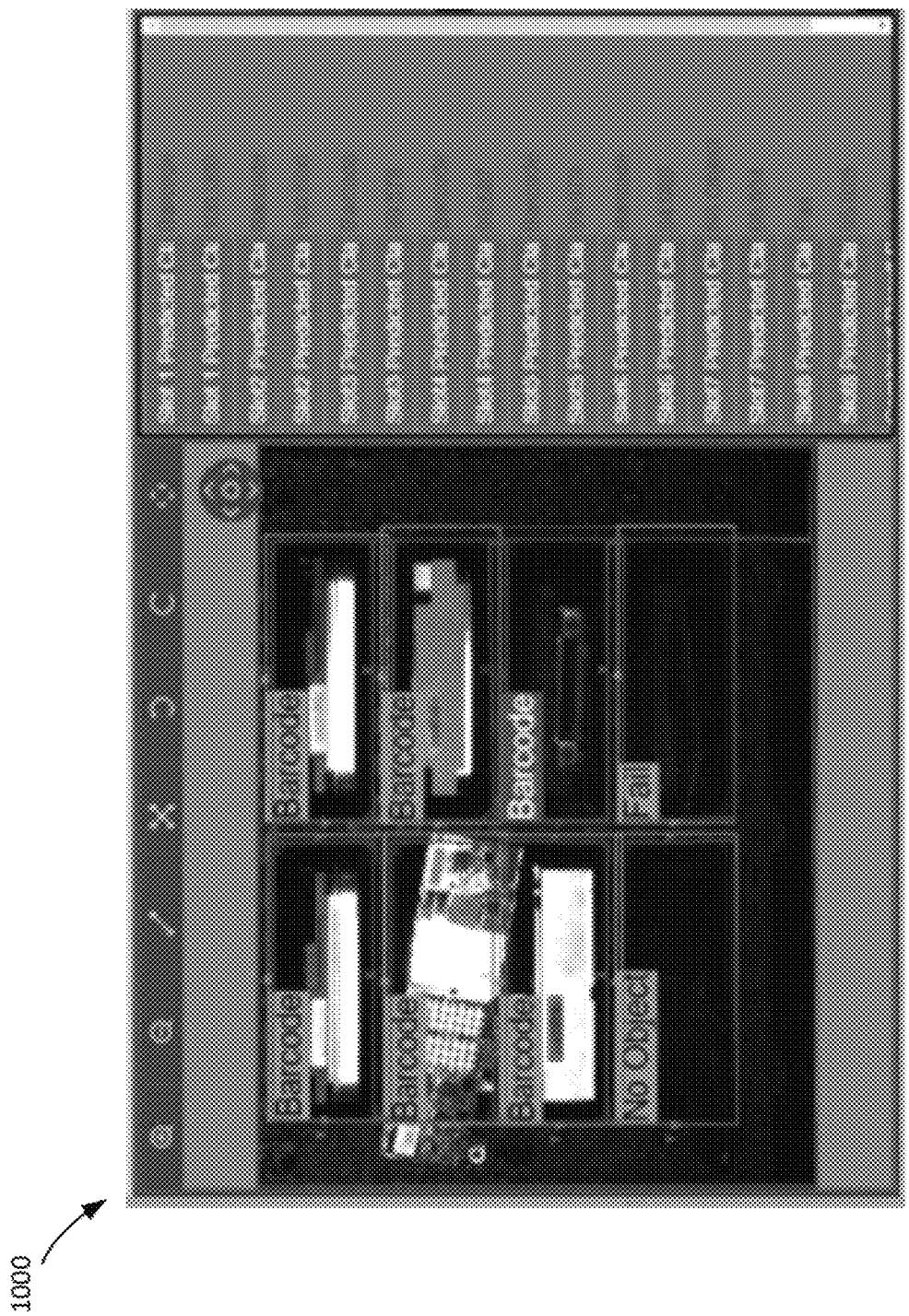
FIG. 10 is an example graphical user interface output of the validation system according to aspects of the disclosure.

FIG. 10 illustrates an example graphical user interface (GUI) 1000. The GUI 1000 may include a representation of the container, user controls, a list view of the results of the image processing. In some examples, the GUI 1000 may divide the representation into the compartments of the container. In some examples, representation may show an entire container. The representation may be segmented similar to the segmentation of the image of the container during image capture and/or processing. The representation may be manipulated or adjusted by a user using the user controls. For example, the representation may be zoomed in on a segment of the representation.

Further to some examples, the output of the representation may include an indication of the results of the image processing on the compartments of the container. For example, the output may include an outline corresponding to and/or indicating the boundaries of the compartments within the container. An indication of the results of the image processing, e.g., valid object, barcode detected, empty, no object, fail, invalid object, etc., may be included as part of the output. In some examples, the barcode may relate and/or correspond to the detection of a valid identifier. In some examples, the indication may also relate to information associated with the identifier, such as destined for shipping or destruction. The indication may be shown in various colors to quickly relay the results of the image processing to the user. For example, the system may color the valid object detections in a green color, and objects detected as invalid in a red color. The list view of the image processing results may depict the results of an image of a container in a word format.

In some examples, the system may validate the container once the system has determined that the slots in the container are empty and/or have valid objects. Based on the validation, the system may determine that the objects in the container are intended for destruction. In some examples, the validation system may include a destruction validation system.

Figure 11:
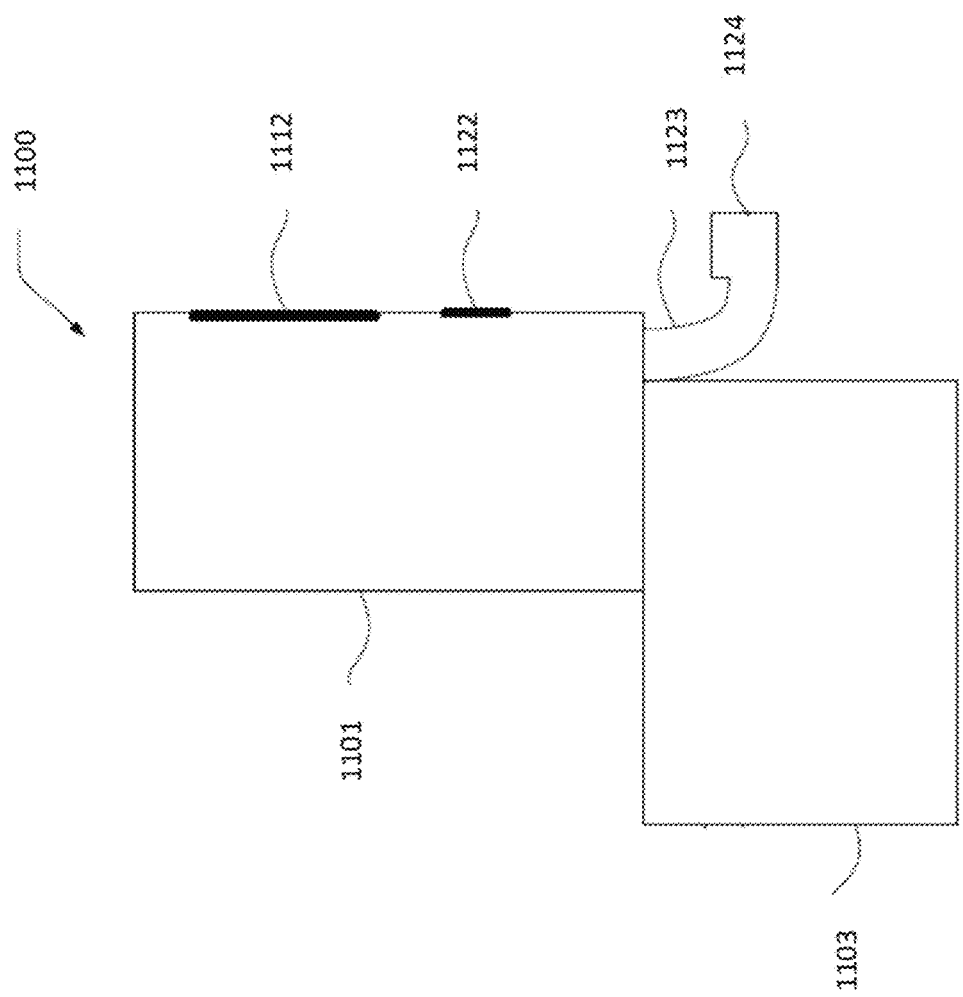
FIG. 11 is a diagram of the destruction validation system of the validation system according to aspects of the disclosure.

FIG. 11 illustrates a destruction validation system 1100. The destruction validation system 1100 may be used for tracking, destroying, and validating the destruction of objects, such as physical media, hard drives, solid state hard drives, compact discs, memory modules, etc. The destruction validation system 1100 includes, for example, a destruction device 1103, a second imaging system, and a locking cabin 1101. The locking cabin 1101 may be situated on the atop of the destruction device 1103.

For each object inserted into the insertion slot 1122, the destruction validation system 1100 may determine whether the inserted object is an object that is supposed to be destroyed. For example, the object may include an identifier, such as a barcode, QR code, or the like. The identifier may be the same identifier that was used to determine whether the object is a valid object when comparing the captured image to the reference image in the validation system. The destruction validation system 1100 may scan, capture an image of, or read the identifier using an imaging system, camera, reader, or the like. The identifier may be compared to known identifiers of objects that are intended to be destroyed. If the identifier on the inserted object matches a known identifier, the destruction validation system 1100 confirms that the inserted object is supposed to be destroyed. In the event the inserted object is not supposed to be destroyed, it may be rejected and ejected from the destruction validation system 1100 via the ejection chute 1123 to the collection bin 1124. In examples where the inserted object is confirmed for destruction, the object may be logged by the validation and tracking device. In some instances, confirmation that the destruction of the object may proceed may be requested via input device 1112. The object may be dropped or released to the destruction device 1103 for destruction once approved by the destruction validation system 1100. In some examples, the object may be released after receiving an input, e.g., via input device 1112, corresponding to confirmation of destruction.

The destruction validation system 1100 may be configured to be integrated with destruction devices 1103. In this regard, the validation and tracking device may be configured to mount or otherwise couple to the destruction devices. The destruction device 1103 may be a shredder, an incinerator, a magnet, or any device capable of destroying objects, e.g., hardware or disks. In some instances, the destruction validation system 1100 may be configured to control the operation of the destruction devices, such as initiating destruction of objects.

The destruction validation system 1100 may monitor the destruction device 1103 to confirm the piece of physical media is destroyed. For example, the destruction device 1103 may include a second imaging system. The second imaging system may be within the locking cabin 1101. The second imaging system may comprise at least one imaging device, such as a camera. The destruction validation system 1100 determines that the objects intended to be destroyed have been placed in the locking cabin 1101 based on one or more images captured of the interior of the locking cabin 1101. For example, the destruction validation system 1100 may detect, based on a captured image, an identifier on the object placed in the locking cabin 1101. In some examples, rather than a captured image, the camera may provide a live feed that is used to detect identifiers of objects within the locking cabin. In such an example, by using a live feed versus capturing an image, computational resources may be used as images do not have to be saved to memory. In some examples, such as those when images are captured, computational resources may be conserved by temporarily saving the images to detect the identifier and, after the detection, deleting the image.

The detected identifier may be compared to the list of known identifiers for objects intended to be destroyed. If the detected identifier corresponds to a known identifier, e.g., an identifier on the list, the object is validated and ready for destruction. Once the object(s) within the locking cabin 1101 have been validated, the destruction validation system 1100 may cause the locking cabin to release the objects into the destruction device 1103. According to some examples, the second imaging system may capture one or more images of the objects being released into the destruction device 1103. The captured images may be provided as part of a report or evidence confirming the destruction of the objects.

The destruction device 1103 may be activated by the system 1100. After a period of time, the second imaging system may capture another image of the locking cabin 1101 interior to confirm the objects have been destroyed. In some examples, there may be a set period of time before the second imaging system captures the second image of the interior of the locking cabin 1101. The period of time may be based on the contents placed in the locking cabin 1101. For example, if three disks are placed in the locking cabin, the system may determine, from the first image of the interior of the locking cabin and the type of destruction device, the destruction device 1103 requires two minutes to completely destroy the disks. After the two minutes has elapsed, the imaging system may capture the second image of the interior of the locking cabin. and processed in a destruction machine. After the destruction validation machine has confirmed the objects have been destroyed, it may send a notification to a central management system.

Many data centers, enterprises, companies, individuals, and other entities maintain data destruction policies that require objects, such as physical media, be destroyed after it is done being used. The purpose of these policies is to assure the data stored on the physical media is not retrieved or possibly recreated by a party that should not have access to it. Typical methods of destroying the physical media, including the use of disk shredders or other devices, require operators to manually track and log the destruction of the physical media. Manual tracking and logging may be prone to errors such as the destruction of the wrong piece of physical media or failure to complete the destruction of the piece of physical media. For example, an operator may log a piece of physical media being destroyed but forget to place the piece of physical media in the disk shredder. Such errors and failure of destruction may result in the loss of data if the wrong piece of physical media is shredded or allow access to physical media storing data by individuals who should not have access to that data. The destruction validation system 1100 described herein provides automated logging and tracking of the destruction of physical media. Additionally, the system provides confirmation that the destruction of the physical media has occurred.

Further, the destruction validation system allows for a more efficient process of confirming destruction of sensitive material. Further, the destruction validation system provides a means for authenticating the destruction of an object at a later date. For example, the destruction validation system can store images of the cabin before and after the destruction of an object. These images may be associated with the object on the central management system. These images may be recalled by a data center user or a data management auditor to confirm the object has been completely and properly destroyed.

Figure 12:
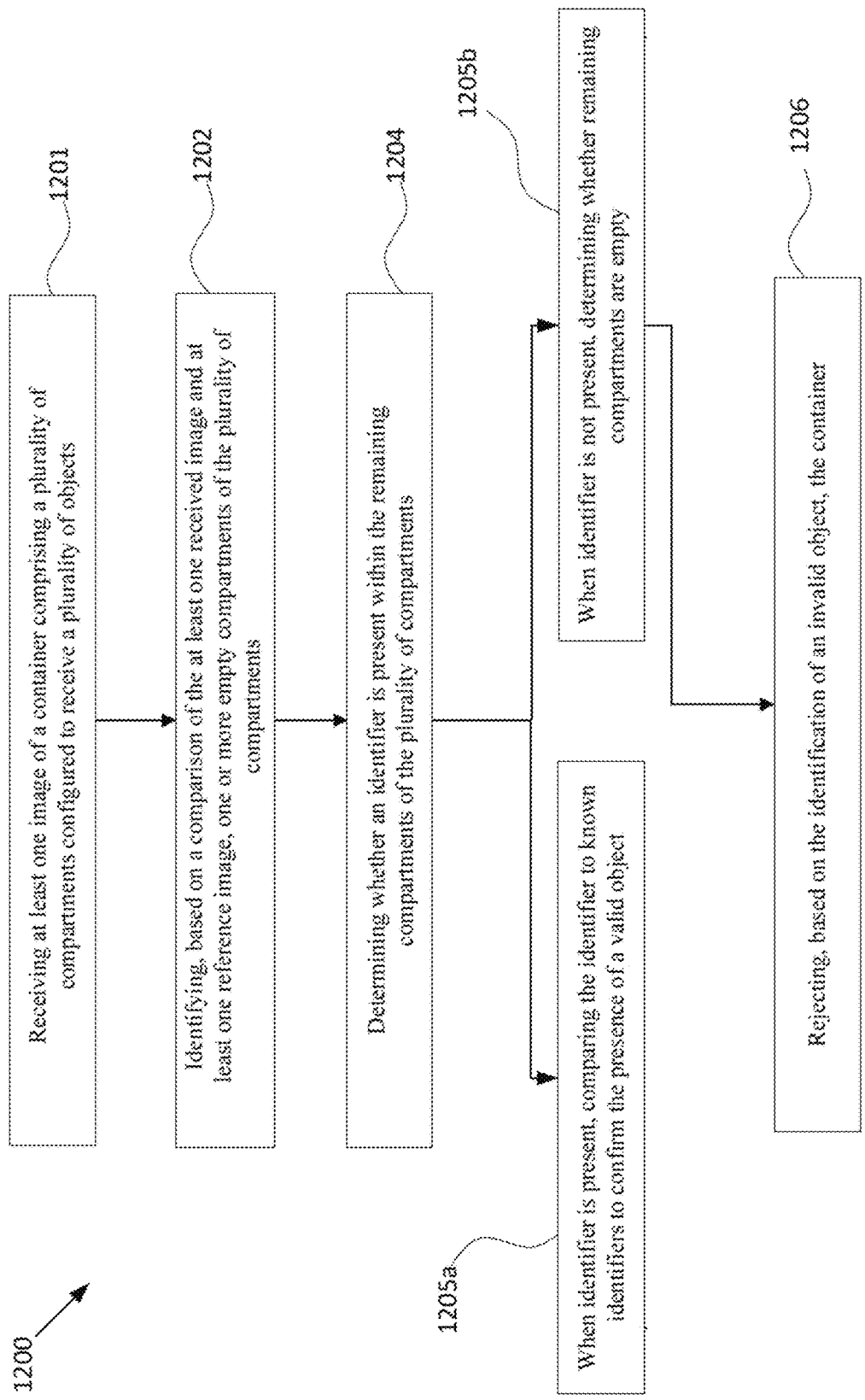
FIG. 12 is a flow chart of an example method of validating objects in a container according to aspects of the disclosure.

FIG. 12 is a flow diagram of an example method 1200 of using a validation system to determine if objects within a container are valid or invalid. The method 1200 may be performed on objects within a container by the validation system, including one or more processors, an imaging system, comprising at least one imaging device and at least one light. While the operations are illustrated and described in a particular order, it should be understood that the order may be modified and that operations may be added or omitted.

In block 1201, the system may receive at least one image of a container comprising a plurality of compartments configured to receive objects or a plurality of objects. In some examples, the system may receive the container in a cabin of the system to be imaged. The plurality of objects may be disks, hard drives, storage media, etc. In some examples, the plurality of compartments may be sized to fit the objects. In some examples, the container may have a matte black finish. In some examples, the container may have markings to assist in aligning the container during image processing.

An image of the container may be captured using an imaging component. In some examples, the imaging component may be an imaging system. The imaging system may comprise at least one imaging device and at least one light configured to illuminate the compartments during image capture. The imaging component may capture, using the imaging component, an image of the container. Capturing an image of the container may include a sequence of various lights of the imaging component to illuminate the compartments.

In block 1202, the system may identify one or more empty compartments based on the results of a comparison of the captured image of the container and a reference image. The reference image may set ground truth characteristics as a basis for the comparison. In some examples, the finish, color, size, and markings in the reference image may be the ground truth characteristics. The comparison may result in a delta between the image of the container and the reference image. In some examples, the delta may correspond to a numerical value associated with the difference between the image of the container and the reference image. In some examples, the method may further comprise setting a threshold delta, of difference between the ground truth characteristics and the image of the container.

In some examples, the system may adjust or rotate the captured image of the container to align with the reference image. The alignment may be based on common markings on the container and in the reference image. In some examples, the image of the container may be divided into segments, such as quadrants. According to some examples, based on the captured image, the system may adjust the position of the container to align with the orientation of the container in the reference image. In such an example, one or more additional images may be captured with the container in the updated position.

For example, the system may determine a compartment is empty when the delta between the reference image and the image of the container is below the threshold. The empty compartments may require no further processing.

According to some examples, the presence of objects within the remaining compartments of the plurality of compartments may be identified based on the results of the comparison. The objects may be identified as areas of the image of the container wherein the delta between the image and the reference image are above the threshold.

In block 1204, the system may determine whether an identifier is present on each of the plurality of objects. The method may use blob detection to determine if identifiers are present. The identifiers may be associated with the object to which it is affixed. In some examples, the identifiers may be barcodes or QR codes. If an identifier is present on the object, the method 1200 will compare the identifiers to known identifiers to determine if the object is valid.

In block 1205a, the system may compare, when the identifier is present, the identifier to known identifiers to confirm the presence of a valid object. A valid object may be an object with an identifier that corresponds to a known identifier. In some examples, a valid object may be an object that is ready to be shipped off or ready to be destroyed. An invalid object may be an object that is missing an identifier or an object whose identifier does not match a known identifier. The known identifiers may be stored on a central management system that is communicatively coupled to the system.

In block 1205b, the system may determine, when an identifier is not present, whether the remaining compartments are empty. To determine whether the remaining compartments are empty, the system may process, using blob detection, the at least one image to identify regions of interest in the at least one image. Optical characteristics of the regions of interest may be compared with the ground truth characteristics. The ground truth characteristics are based on the reference image. For example, the pixels, brightness, intensity, color, etc. of the reference image may be used as ground truth characteristics. When the difference between the optical characteristics and the ground truth characteristics is greater than a threshold, the region of interest may be identified as an invalid object. In examples where the difference between the optical characteristics of the at least one image, e.g., the captured image, is less than the threshold, the region of interest may be determined to be empty, e.g., no object is present in the region of interest.

In block 1206, the system may reject, based on the identification of the invalid object, the container from the validation system. In some examples, where only valid objects are identified, the method may transport the container to another area for shipping or for destruction. In some examples, the system will automatically reject containers that are not intended for use with the system. Containers have a barcode on them that is read by the system. If that barcode shows an invalid container or a barcode is not present where expected on the container the system faults.

Aspects of this disclosure can be implemented in digital electronic circuitry, in tangibly-embodied computer software or firmware, and/or in computer hardware, such as the structure disclosed herein, their structural equivalents, or combinations thereof. Aspects of this disclosure can further be implemented as one or more computer programs, such as one or more modules of computer program instructions encoded on a tangible non-transitory computer storage medium for execution by, or to control the operation of, one or more data processing apparatus. The computer storage medium can be a machine-readable storage device, a machine-readable storage substrate, a random or serial access memory device, or combinations thereof. The computer program instructions can be encoded on an artificially generated propagated signal, such as a machine-generated electrical, optical, or electromagnetic signal, which is generated to encode information for transmission to suitable receiver apparatus for execution by a data processing apparatus.

The term "configured" is used herein in connection with systems and computer program components. For a system of one or more computers to be configured to perform particular operations or actions means that the system has installed on it software, firmware, hardware, or a combination thereof that cause the system to perform the operations or actions. For one or more computer programs to be configured to perform particular operations or actions means that the one or more programs include instructions that, when executed by one or more data processing apparatus, cause the apparatus to perform the operations or actions.

The term "data processing apparatus" refers to data processing hardware and encompasses various apparatus, devices, and machines for processing data, including programmable processors, a computer, or combinations thereof. The data processing apparatus can include special purpose logic circuitry, such as a field programmable gate array (FPGA) or an application specific integrated circuit (ASIC). The data processing apparatus can include code that creates an execution environment for computer programs, such as code that constitutes processor firmware, a protocol stack, a database management system, an operating system, or combinations thereof.

The data processing apparatus can include special-purpose hardware accelerator units for implementing machine learning models to process common and compute-intensive parts of machine learning training or production, such as inference or workloads. Machine learning models can be implemented and deployed using one or more machine learning frameworks, such as static or dynamic computational graph frameworks.

The term "computer program" refers to a program, software, a software application, an app, a module, a software module, a script, or code. The computer program can be written in any form of programming language, including compiled, interpreted, declarative, or procedural languages, or combinations thereof. The computer program can be deployed in any form, including as a stand alone program or as a module, component, subroutine, or other unit suitable for use in a computing environment. The computer program can correspond to a file in a file system and can be stored in a portion of a file that holds other programs or data, such as one or more scripts stored in a markup language document, in a single file dedicated to the program in question, or in multiple coordinated files, such as files that store one or more modules, sub programs, or portions of code. The computer program can be executed on one computer or on multiple computers that are located at one site or distributed across multiple sites and interconnected by a data communication network.

The term "database" refers to any collection of data. The data can be unstructured or structured in any manner. The data can be stored on one or more storage devices in one or more locations. For example, an index database can include multiple collections of data, each of which may be organized and accessed differently.

The term "engine" refers to a software-based system, subsystem, or process that is programmed to perform one or more specific functions. The engine can be implemented as one or more software modules or components, or can be installed on one or more computers in one or more locations. A particular engine can have one or more computers dedicated thereto, or multiple engines can be installed and running on the same computer or computers.

The processes and logic flows described herein can be performed by one or more computers executing one or more computer programs to perform functions by operating on input data and generating output data. The processes and logic flows can also be performed by special purpose logic circuitry, or by a combination of special purpose logic circuitry and one or more computers.

A computer or special purpose logic circuitry executing the one or more computer programs can include a central processing unit, including general or special purpose microprocessors, for performing or executing instructions and one or more memory devices for storing the instructions and data. The central processing unit can receive instructions and data from the one or more memory devices, such as read only memory, random access memory, or combinations thereof, and can perform or execute the instructions. The computer or special purpose logic circuitry can also include, or be operatively coupled to, one or more storage devices for storing data, such as magnetic, magneto optical disks, or optical disks, for receiving data from or transferring data to. The computer or special purpose logic circuitry can be embedded in another device, such as a mobile phone, a personal digital assistant (PDA), a mobile audio or video player, a game console, a Global Positioning System (GPS), or a portable storage device, e.g., a universal serial bus (USB) flash drive, as examples.

Computer readable media suitable for storing the one or more computer programs can include any form of volatile or non-volatile memory, media, or memory devices. Examples include semiconductor memory devices, e.g., EPROM, EEPROM, or flash memory devices, magnetic disks, e.g., internal hard disks or removable disks, magneto optical disks, CD-ROM disks, DVD-ROM disks, or combinations thereof.

Aspects of the disclosure can be implemented in a computing system that includes a back end component, e.g., as a data server, a middleware component, e.g., an application server, or a front end component, e.g., a client computer having a graphical user interface, a web browser, or an app, or any combination thereof. The components of the system can be interconnected by any form or medium of digital data communication, such as a communication network. Examples of communication networks include a local area network (LAN) and a wide area network (WAN), e.g., the Internet.

The computing system can include clients and servers. A client and server can be remote from each other and interact through a communication network. The relationship of client and server arises by virtue of the computer programs running on the respective computers and having a client-server relationship to each other. For example, a server can transmit data, e.g., an HTML page, to a client device, e.g., for purposes of displaying data to and receiving user input from a user interacting with the client device. Data generated at the client device, e.g., a result of the user interaction, can be received at the server from the client device.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible examples. Further, the same reference numbers in different drawings can identify the same or similar elements.

Although the disclosure herein has been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims.

The invention claimed is:

1. A system, comprising:
a cabin configured to receive a container comprising compartments configured to receive an object;
an imaging system housed within the cabin, the imaging system comprising:
at least one imaging device;
at least one light configured to illuminate the container during image capture;
one or more processors, the one or more processors configured to:
receive at least one image captured by the at least one imaging device;
identify, using image processing by comparing the at least one image to a reference image, one or more empty compartments;
determine, using image processing, whether an identifier associated with the object is present within the remaining compartments;
when the identifier is present, compare the identifier to known identifiers to confirm the presence of a valid object in the remaining compartments;
when the identifier is not present, determine whether the remaining compartments are empty, the determining comprising:
process, using blob detection, the at least one image to identify regions of interest in the at least one image;
compare optical characteristics of the regions of interest with ground truth characteristics, wherein the ground truth characteristics are based on the reference image; and
when a difference, based on the comparison, between the optical characteristics and the ground truth characteristics is greater than a threshold, identify the region of interest as an invalid object.

2. The system of claim 1, wherein the one or more processors are further configured to adjust the orientation of the at least one image to correspond to an orientation of a reference image of the container.

3. The system of claim 1, wherein when the difference between the optical characteristics of regions of interest and the ground truth characteristics are less than the threshold, identify the region of interest empty.

4. The system of claim 1, wherein when the region of interest is identified as the invalid object, the one or more processors are further configured to provide for out a notification associated with the identification of an invalid object.

5. The system of claim 4, wherein the notification is further associated with at least one of the remaining compartments.

6. The system of claim 1, wherein the identifier is a barcode, QR code, or Detex code.

7. The system of claim 1, wherein when the region of interest is identified as the invalid object, the one or more processors are further configured to reject the container.

8. The system of claim 1, further comprising a central management system comprising:
memory storing the known identifiers, and
one or more processors in communication with the memory, the one or more processors configured to:
receive, from the imaging system, a notification indicating a validation of the container; and
determine, based on the validation of the container and the identifiers associated with the objects within the container, a next action.

9. The system of claim 8, wherein the next action includes at least one of a destruction action or a shipping action.

10. The system of claim 9, wherein when the next action is the destruction action, the system further comprises a destruction validation system, the destruction validation system comprising:
a destruction device, comprising an opening;
a locking cabin situated at the opening of the destruction device, wherein the locking cabin is configured to receive the object whose determined next action is the destruction action;
a second imaging system comprising at least one imaging device,
one or more second processors configured to:
receive at least one image captured by the at least one imaging device;
identify, using image processing techniques, the object whose next action is the destruction action has been placed in the locking cabin;
instruct the locking cabin to drop the object whose next action was the destruction action into the destruction device;
instruct the destruction device to activate;
instruct, after an amount of time, the second imaging system to capture a second image of the locking cabin;
receive the second image;
verify the object whose next action was the destruction action has been destroyed; and
transmit a notification confirming the object has been destroyed to the central management system.

11. A method, comprising:
receiving, by one or more processors of a validation system, at least one image of a container comprising a plurality of compartments configured to receive a plurality of objects;
identifying, by the one or more processors based on a comparison of the at least one received image and at least one image to a reference image, one or more empty compartments of the plurality of compartments;
determining, by the one or more processors, whether an identifier is present within the remaining compartments of the plurality of compartments;
when the identifier is present, comparing, by the one or more processors, the identifier to known identifiers to confirm the presence of a valid object in the remaining compartments;
when the identifier is not present, determining, by the one or more processors, whether the remaining compartments are empty, the determining comprising:
processing, using blob detection, the image to identify regions of interest in the image;
comparing optical characteristics of the regions of interest with ground truth characteristics, wherein the ground truth characteristics are based on the reference image; and
when a difference, based on the comparison, between the optical characteristics and the ground truth characteristics is greater than a threshold, identifying the region of interest as an invalid object; and
rejecting, by the one or more processors based on the identification of the invalid object, the container from the validation system.

12. The method of claim 11, further comprising capturing, by an imaging component, the at least one image, wherein the imaging component comprises at least one imaging device and at least one light configured to illuminate the plurality of compartments.

13. The method of claim 12, further comprising adjusting the orientation of the at least one image to correspond to an orientation of a reference image of the container.

14. The method of claim 12, further comprising, when the difference between the optical characteristics of regions of interest and the ground truth characteristics are less than the threshold, identifying, by the one or more processors, the region of interest empty.

15. The method of claim 12, further comprising, when the region of interest is identified as the invalid object, providing, by the one or more processors, for output a notification associated with the identification of an invalid object.

16. The method of claim 15, wherein the notification is further associated with at least one of the remaining compartments.

17. The method of claim 12, wherein the identifier is a barcode, QR code, or Detex code.

18. The method of claim 12, wherein when the region of interest is identified as the invalid object, rejecting, by the one or more processors, the container.

19. The method of claim 12, further comprising:
coupling the validation system to a central management system comprising memory storing the known identifiers,
receiving, by the one or more processors, a notification indicating a validation of the container; and
determining, by the one or more processors based on the validation of the container and the identifiers associated with the objects within the container, a next action, wherein the next action includes at least one of a destruction action or a shipping action.

20. The method of claim 19, wherein when the next action is the destruction action, the method further comprises coupling the validation system to a destruction validation system, the destruction validation system comprising:
a destruction device, comprising an opening;
a locking cabin situated at the opening of the destruction device, wherein the locking cabin is configured to receive the object whose determined next action is the destruction action;
a second imaging system comprising at least one imaging device,
one or more second processors configured to:
receive at least one image captured by the at least one imaging device;
identify, using image processing techniques, the object whose next action is the destruction action has been placed in the locking cabin;
instruct the locking cabin to drop the object whose next action was the destruction action into the destruction device;
instruct the destruction device to activate;
instruct, after an amount of time, the second imaging system to capture a second image of the locking cabin;
receive the second image;
verify the object whose next action was the destruction action has been destroyed; and
transmit a notification confirming the object has been destroyed to the central management system.

* * * * *